US008073242B2

(12) United States Patent
Miyamoto et al.

(10) Patent No.: US 8,073,242 B2
(45) Date of Patent: Dec. 6, 2011

(54) SEM SYSTEM AND A METHOD FOR PRODUCING A RECIPE

(75) Inventors: Atsushi Miyamoto, Yokohama (JP);
Tomofumi Nishiura, Kawasaki (JP);
Ryoichi Matsuoka, Yotsukaido (JP);
Hidetoshi Morokuma, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 1027 days.

(21) Appl. No.: 11/954,410

(22) Filed: Dec. 12, 2007

(65) Prior Publication Data

US 2008/0159609 A1     Jul. 3, 2008

(30) Foreign Application Priority Data

Dec. 13, 2006    (JP) .................................. 2006-336164

(51) Int. Cl.
*G06K 9/00*       (2006.01)

(52) U.S. Cl. ........ 382/149; 382/141; 382/144; 382/147; 382/151; 250/306; 250/307; 250/310; 250/311; 700/121

(58) Field of Classification Search .................. 382/141, 382/144, 147, 149, 151; 250/306, 307, 310, 250/311; 700/121
See application file for complete search history.

(56) References Cited

U.S. PATENT DOCUMENTS

| | | | |
|---|---|---|---|
| 6,614,923 B1 * | 9/2003 | Watanabe et al. ............. | 382/149 |
| 7,034,298 B2 | 4/2006 | Miyai et al. | |
| 7,235,782 B2 * | 6/2007 | Takane et al. ................. | 250/310 |
| 7,712,056 B2 * | 5/2010 | White et al. ................... | 716/136 |

FOREIGN PATENT DOCUMENTS

| | | |
|---|---|---|
| JP | 11-194154 | 7/1999 |
| JP | 2000-329521 | 11/2000 |
| JP | 2000-348658 | 12/2000 |
| JP | 2002-328015 | 11/2002 |
| JP | 2003-083908 | 3/2003 |
| JP | 2004-117130 | 4/2004 |

* cited by examiner

*Primary Examiner* — Robert Kim
*Assistant Examiner* — Michael Logie
(74) *Attorney, Agent, or Firm* — Antonelli, Terry, Stout & Kraus, LLP.

(57) ABSTRACT

This invention relates to a SEM system constructed to create imaging recipes or/and measuring recipes automatically and at high speed, and improve inspection efficiency and an automation ratio, and to a method using the SEM system; a method for creation of imaging recipes and measuring recipes in the SEM system is adapted to include, in a recipe arithmetic unit, the steps of evaluating a tolerance for an imaging position error level at an evaluation point, evaluating a value predicted of the imaging position error level at the evaluation point when any region on circuit pattern design data is defined as an addressing point, and determining an imaging recipe and a measuring recipe on the basis of a relationship between the tolerance for the imaging position error level at the evaluation point and the predicted value of the imaging position error level at the evaluation point.

22 Claims, 11 Drawing Sheets

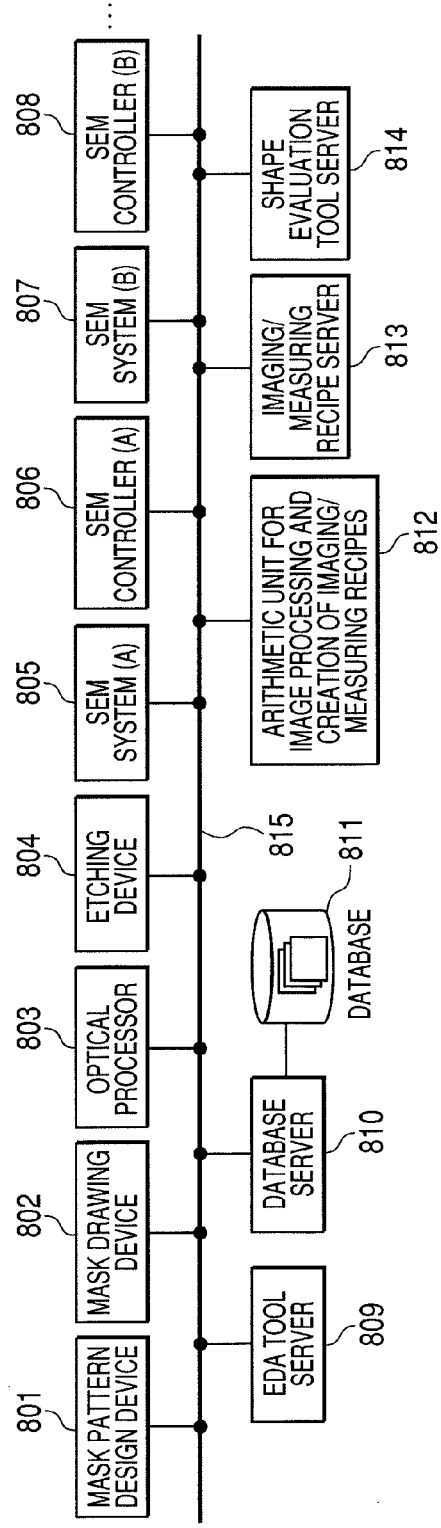
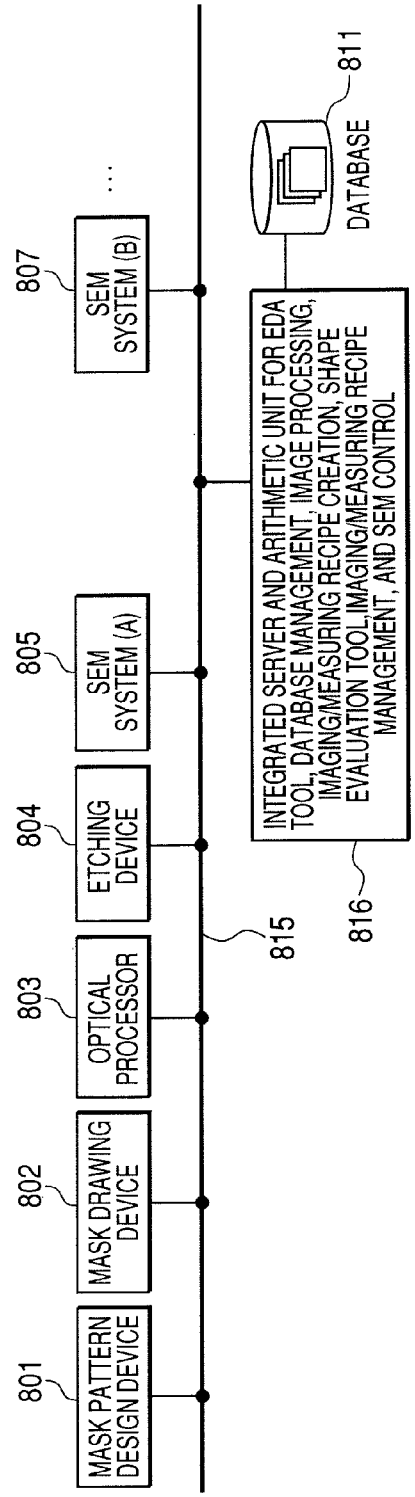

FIG. 7A
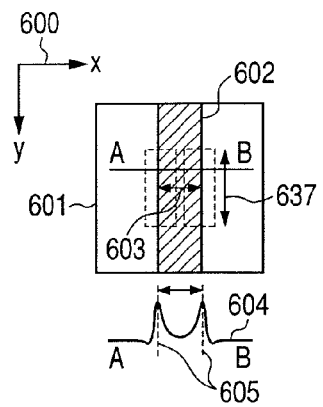
FIG. 7B
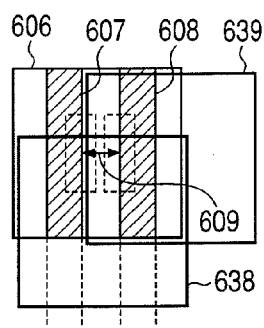
FIG. 7C
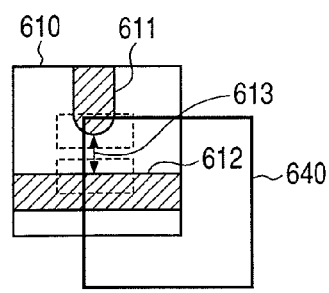
FIG. 7D
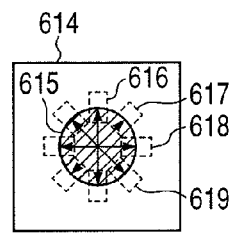
FIG. 7E
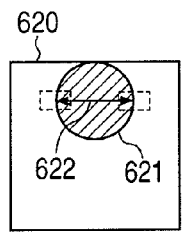
FIG. 7F
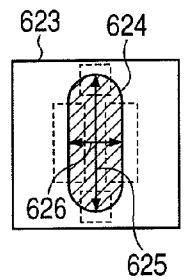
FIG. 7G
FIG. 7H   FIG. 7I
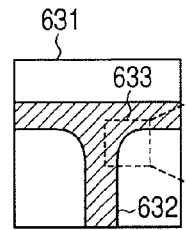
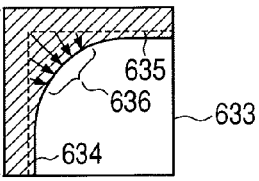

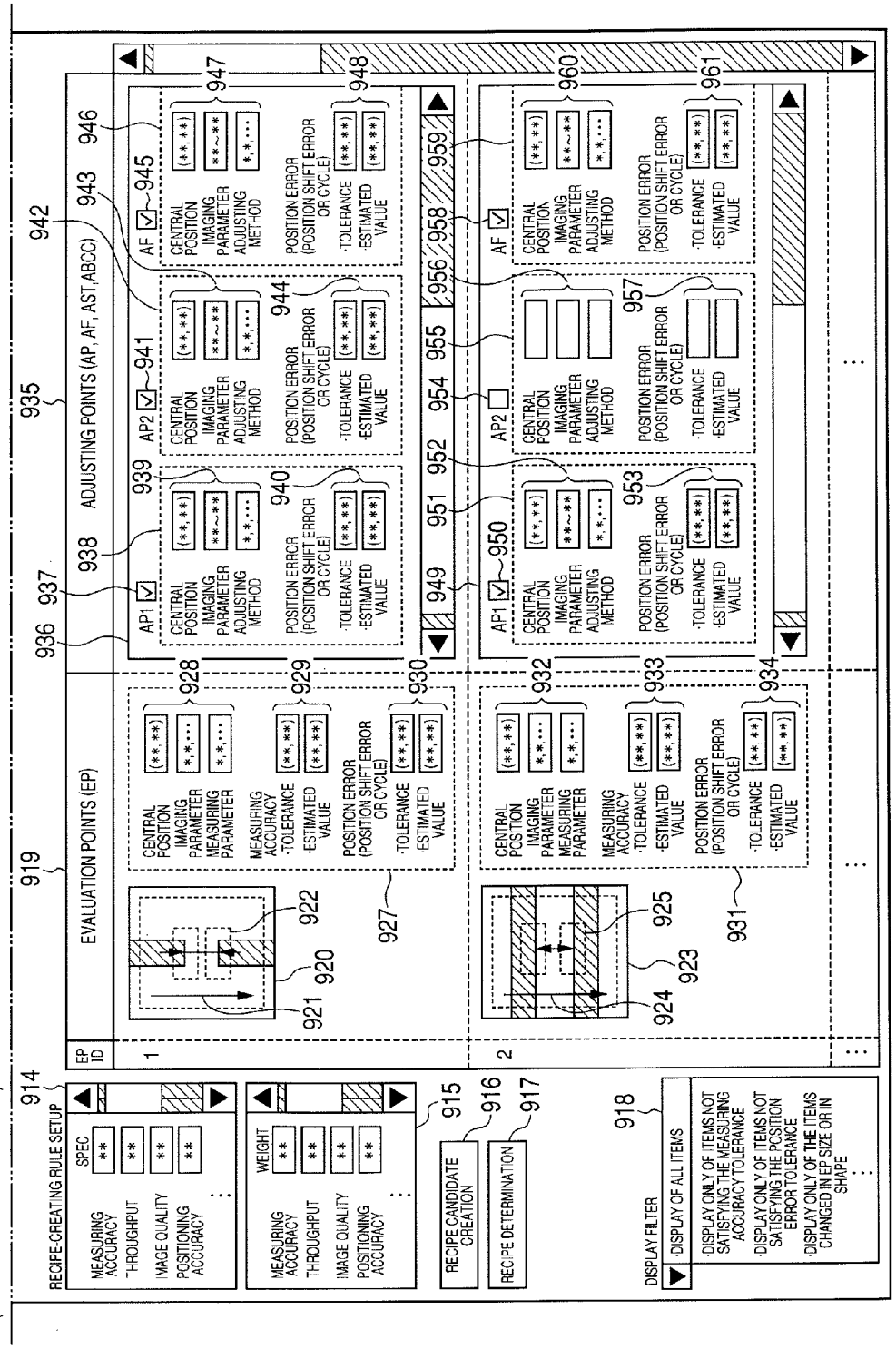

SEM SYSTEM AND A METHOD FOR PRODUCING A RECIPE

BACKGROUND OF THE INVENTION

The present invention relates generally to scanning electron microscope (SEM) systems that can automatically acquire images of any evaluation point on a specimen and evaluate a circuit pattern formed at the evaluation point, and to methods using the SEM systems. More particularly, the invention concerns a SEM system having an imaging recipe and measuring recipe auto-creating function which determines an imaging recipe and measuring recipe constructed to allow acquisition of a SEM image of any evaluation point and desired evaluation for this point (e.g., measurement of line pattern wiring widths or line pattern gaps and extraction of image feature quantities of a defective region). The imaging recipe and measuring recipe is determined from circuit pattern design data automatically and without using an actual wafer. The invention also concerns a method that uses the above SEM system.

A wiring pattern is formed on a semiconductor wafer by applying a coating material, called the resist, to the surface of the semiconductor wafer, then stacking a wiring pattern exposure mask (reticule) upon the resist, and emitting radiation such as a visible ray, ultraviolet ray, or electron beam, from above the mask. Thus, the resist is photosensitized and the wiring pattern is formed. Since the thus-obtained wiring pattern changes in shape according to the intensity or diameter of the visible ray, ultraviolet ray, or electron beam emitted, the finished state of the pattern needs inspecting to form a more precise wiring pattern. A critical-dimension scanning electron microscope (CD-SEM) has traditionally been used for such inspection. The critical point (hot spot) on the semiconductor pattern which requires inspection can be detected by exposure simulation or the like. The pattern is observed through SEM with the hot spot as an evaluation point (hereinafter, called the EP), the wiring width and other dimension values of the pattern are measured from an observation image thereof, and the finished state of the pattern is evaluated. Evaluation results are fed back to shape correction of the mask pattern and the manufacturing process parameters for the semiconductor in order to achieve a high yield.

In order to obtain higher EP image quality with a minimum shift in imaging position, part or all of four adjusting points, namely, an addressing point (hereinafter, called the AP), an auto-focusing point (likewise, called the AF point), an automatic astigmatism correction point (likewise, called the AST correction point), and an automatic brightness and contrast control point (likewise, called the ABCC point) are first set according to particular requirements. Next, addressing, auto-focusing control, automatic astigmatism correction, and automatic brightness and contrast control are conducted at the respective adjusting points and images of the EP are acquired. The SEM image previously registered as a template at the AP of known coordinates, and the SEM image observed during the actual imaging sequence (this SEM image is referred to as the actual image template) are matched in position, and a shift in the imaging position during this matching step is corrected as the shift in the imaging position during the above addressing step. The above evaluation point (EP) and the adjusting points (the AP, the AF point, the AST correction point, and the ABCC point) are collectively called the imaging point. The position, imaging parameters, and measuring parameters of the EP, the imaging sequence for the EP, the imaging parameters and adjusting methods relating to each adjusting point, and the registered template described above are managed as imaging and measuring recipes, and the SEM conducts imaging and measurements based on the imaging/measuring recipes.

Traditionally, the imaging and measuring recipes have been generated manually by the SEM operator and the generating operations have been labor- and time-consuming tasks. In addition, since determining each adjusting point and registering a template in the imaging and measuring recipes have required imaging the wafer at a low magnification, the generation of the imaging and measuring recipes has been one cause of the decreases in the operation ratio of the SEM system. Furthermore, the number of sections to be evaluated, that is, the number of EPs has explosively increased with the minute and complexity of patterns, so the above manual generation of the imaging and measuring recipes is becoming a non-reality in terms of labor and generating time.

Under such a situation, JP-A-2002-328015, for example, discloses a semiconductor inspection system adapted to determine the AP on the basis of the semiconductor circuit pattern design data expressed in the GDSII format, further extract the data at the AP from the design data, and register the extracted data as the registered template in an imaging/measuring recipe. In the conventional system proposed in above document 2002-328015, the operation ratio of the SEM improves since actual wafer imaging intended only to determine the AP and register the template is not required. In addition, after acquiring a SEM image at the AP (i.e., an actual image template) during an actual imaging sequence, the conventional system can match the actual image template and the registered template of the design data, re-register a SEM image associated with the position of the registered template of the design data, as a template in an imaging/measuring recipe, and use the re-registered SEM image template in an addressing step. Furthermore, the conventional system has a function that automatically detects a distinctive pattern section from the design data and registers the detected pattern section as an AP.

SUMMARY OF THE INVENTION

The present invention relates to a SEM system having a function that creates an imaging/measuring recipe automatically, and to an imaging/measuring recipe creating method using the SEM system, and the invention is intended to solve the following problems associated with the creation of an imaging/measuring recipe:

Imaging and measuring recipes must be such that user-intended measurements can be realized at evaluation points. However, the positioning accuracy, visual field, and imaging magnification required during EP imaging differ according to the kind of dimension data to be measured, the dimension-measuring accuracy required, and the particular shape of the pattern formed around the EP. For example, the kind of dimension data here refers to: the position and kind of critical point on the semiconductor which requires inspection at the AP; and a method of measuring the dimension at the critical point or the kind of measurement, that is, line pattern width measurement, line pattern gap measurement, contact hole diameter measurement, measurement of an optical proximity correction (OPC) shape, or the like.

Only EP coordinate data has been given to conventional SEM systems. For this reason, during EP imaging based on the imaging recipe and measuring recipe created without consideration paid to the causative factors in EP-by-EP changes, such as the kind of dimension data to be measured, the dimension-measuring accuracy required, and the shape of the peripheral pattern, imaging position errors or the inappropriate field size or imaging magnification at the EP has occasionally made it impossible to obtain the data measurements satisfying the positioning accuracy required. Conversely, as a result of the pursuit of excessive image acquisition positioning accuracy at the EP, the generation of the imaging and measuring recipes has sometimes become impossible since the AP high enough in addressing accuracy for the attainment of the above positioning accuracy has been missing on the circuit pattern around the EP. If the SEM operator verifies and corrects each such problem, inspection efficiency and an automation ratio will significantly decrease.

In order to achieve the foregoing object, the present invention provides, as one aspect thereof, a method for creating an imaging recipe or/and a measuring recipe to image a particular point on a pattern formed on a specimen, or/and to measure an evaluation point on the specimen, by using a SEM system equipped with a scanning electron microscope and with a recipe arithmetic unit. The method for creating an imaging recipe or/and a measuring recipe includes: an input step for entering a position of the evaluation point on the specimen and design data for a circuit pattern around the evaluation point into the recipe arithmetic unit; an evaluation point imaging position error evaluation step for evaluating, in the recipe arithmetic unit, a tolerance for an imaging position error at the evaluation point, on the basis of the specimen evaluation point position and peripheral circuit pattern design data that have been input in the input step; an addressing evaluation step for evaluating, on the basis of the input specimen evaluation point position and peripheral circuit pattern design data, a value predicted of the imaging position error at the evaluation point when any region on the circuit pattern design data is taken as an addressing point; and a parameter determination step for determining, as the imaging recipe, positions of adjusting points including at least the addressing point, or an imaging sequence or imaging parameters or adjusting methods for each adjusting point, or as the measuring recipe, a position of the evaluation point or imaging parameters or measuring parameters for the evaluation point, on the basis of a relationship between the tolerance for the imaging position error at the evaluation point, evaluated in the step of evaluating the imaging position error at the evaluation point, and the predicted value of the imaging position error at the evaluation point, evaluated in the addressing evaluation step.

The present invention also relates to: a SEM system adapted to automatically create an imaging recipe or/and measuring recipe for specifying image acquisition information and measurement information using the below-listed means, and having an automatic imaging and measuring function that conducts imaging and measurements using the automatically created imaging recipe or/and measuring recipe; and a method for conducting the above using the SEM system.

(1) In addition to coordinate data concerning an EP, design data concerning a circuit pattern around the EP is used as an input, a user-desired kind of dimensional value is estimated from the EP coordinate data and the design data, estimated specifications requirements are calculated from the estimated kind of dimensional value (more specifically, these specifications refer to any combination of the later-described kinds of information included in the estimated specifications requirements; especially, independent EP-imaging tolerances for imaging position errors in X- and Y-directions each, or independent values required of addressing accuracy at APs inversely calculated from the above tolerances in the X- and Y-directions each), and any combination of three items that satisfy the estimated specifications requirements is determined. The three items here mean: (1a) an imaging sequence (a position of an adjusting point which is a combination of adjusting points including at least either an AP, an AF point, an AST correction point, or an ABCC point, or more than one thereof, and an order of imaging each adjusting point); (1b) parameters for imaging each adjusting point (these parameters include at least either a field size, an imaging magnification, the number of frames added, an electron beam scanning direction, an electron beam accelerating voltage, or an electron beam probing current, or more than one thereof); and (1c) any combination of methods of conducting adjustments at each adjusting point (addressing, auto-focusing adjustment, automatic astigmatism correction, or automatic brightness and contrast control is available). Above items (1a) to (1c) are collectively called imaging information.

(2) If the imaging information that satisfies the specifications requirements is difficult to determine in above item (1), the user-desired kind of measurement is realized by changing any combination of (2a) a position of the EP, (2b) parameters (conditions) for imaging at the EP (these parameters include either the field size, the imaging magnification, the number of frames added, the electron beam scanning direction, the electron beam accelerating voltage, or the electron beam probing current, or more than one thereof), and (2c) measuring parameters (a section to be measured within the EP field, the kind of dimension to be measured, a method of setting a measuring cursor, and a measuring method/measuring parameter data). Above items (2a) to (2c) are collectively called measuring information. By way of example, if the EP image acquisition positioning accuracy attained in the imaging sequence that was determined in above item (1) is liable to cause a necessary measuring region to overstep the field or if the necessary measuring region has overstepped the field, an appropriate change, such as spreading the field of the EP or reducing the imaging magnification, is conducted considering the measuring accuracy required. This ensures that the region required for the measurement is controlled to stay within the field. As another example, if the semiconductor pattern does not change over an entire permissible beam-shifting range around the EP or if a similar pattern is cyclically formed over a wide range, the AP cannot be set since a unique (addressable) pattern is originally absent around the EP. In such cases, however, even if coordinates of the position to be measured shift in a specific direction dependently upon the kind of measurement at the EP or the position to be measured shifts through several cycles with respect to the cyclic pattern, the data measured at the shifting position may be usable for feedback to mask pattern shape correction or to semiconductor-manufacturing process parameters. The present invention features estimating such permissible imaging position shift direction, permissible imaging position shift cycles, and permissible imaging position error tolerance as described above, and making the measurement successful by modification of the measuring information, inclusive of the EP position change based on estimation results.

(3) In determination of an imaging/measuring recipe, the specifications requirements that the user will expect are input as required, and this allows the imaging/measuring recipe to be determined so as to satisfy these specifications requirements as far as possible. The specifications specifiable for the SEM system in the present invention include (3a) all information specified in the imaging recipe or/and the measuring recipe, (3b) independent EP-imaging tolerances for the imaging position errors in the X- and Y-directions each, or/and the independent values required of the addressing accuracy at the APs in the X- and Y-directions each, and (3c) measuring accuracy, throughput, and image quality. Any combination of above items (3a) to (3c) is called the specifications requirements, and any combination of the information items included in the specifications requirements is specifiable as the user-required specifications. The user-required specifications are likely to vary from user to user. As an example, there can be an option such as: reducing the number of frames to be added, even at a slight sacrifice of measuring accuracy, when one wishes to create an imaging recipe/measuring recipe with importance attached to throughput. This scheme can cope with changes for the user-required specifications flexibly and rapidly.

(4) The modification of the measuring information in above item (2) is likely to increase variations on the imaging information selectable in above item (1). For example, if an AP is absent that satisfies the addressing accuracy value needed to conduct preferable measurements for the field at an EP, spreading the field of the EP may lower the addressing accuracy value required and make it possible to set the AP that satisfies the addressing accuracy value required. Accordingly, the present invention features generating an optimized imaging recipe or/and measuring recipe by interactively conducting the determination of the imaging information, described in above item (1), and the determination of the measuring information, described in above item (2).

(5) Details of the imaging recipes or/and measuring recipes that have been created for each EP by using the methods listed in above items (1) to (4) are displayed on a GUI screen, and if there is anything improper with the particular imaging recipe or/and measuring recipe, the present invention prompts the user to correct the imaging recipe or/and measuring recipe (if the measurement at the EP is impossible, the correction includes deleting the EP or changing the EP coordinate data). Additionally, in order to ensure efficient analysis and correction of each imaging recipe or/and measuring recipe, these imaging or/and measuring recipes are classified from arbitrary viewpoints such as (a) whether the specifications requirements, the estimated specifications requirements, or the user-required specifications are satisfied, (b) if the specifications are not satisfied, classification according to details of the item, and/or (c) whether the EP-imaging parameters have been modified. Classifying the above recipes in this way makes each recipe selectively displayable on the GUI screen.

(6) At least one combination of items (i.e., rules relating to the creation of the imaging recipe or/and the measuring recipe, the created imaging recipe or/and measuring recipe themselves, the specifications requirements, the estimated specifications requirements, the user-required specifications, the images acquired in an actual imaging sequence, measurement results, and a success/failure in imaging or measurement) can be managed as a database in association with one another, and each imaging/measuring recipe is network-sharable in one SEM system or between multiple SEM systems. It is also possible to introduce necessary changes in the imaging recipe/measuring recipe creating rules, based on the database.

The present invention allows any one to readily create highly precise imaging recipes or/and measuring recipes under a waferless environment, automatically, and without a special knowledge of a SEM.

These and other objects, features and advantages of the invention will be apparent from the following more particular description of preferred embodiments of the invention, as illustrated in the accompanying drawings.

BRIEF DESCRIPTION OF THE DRAWINGS

FIG. 1A is a diagram showing an embodiment in which multiple SEM systems according to the present invention are applied to semiconductor device manufacturing equipment.

FIG. 1B is a diagram showing another embodiment in which multiple SEM systems according to the present invention are applied to semiconductor device manufacturing equipment.

FIG. 7A is a plan view of a line pattern, and a diagram showing a SEM waveform signal obtained during line width measurement.

FIG. 7B is a plan view of two line patterns and is a diagram showing a SEM waveform signal obtained during measurement of a gap between the two line patterns.

FIG. 7C is a plan view of a region in which an end gap of a first line pattern and a second line pattern are present.

FIG. 7D is a plan view of a contact hole, showing a plurality of positions for measuring a diameter of the contact hole.

FIG. 7E is a plan view of another contact hole, showing a state in which a diameter of the contact hole is represented by a diameter value measured in one place.

FIG. 7F is a plan view of a pattern, showing a major axial length measuring position and a minor axial length measuring position.

FIG. 7G is a plan view of two positionally shifted line patterns, defining a measuring distance between the line patterns.

FIG. 7H is a plan view of a pattern having corners.

FIG. 7I is an enlarged view showing a SEM image of a corner of the pattern, and is an overlaid representation of the pattern corner's diagram derived from design data.

FIGS. 9A and 9B are a diagram showing an example of a GUI screen display made by a SEM system of the present invention.

DESCRIPTION OF THE PREFERRED EMBODIMENTS

Figure 2:
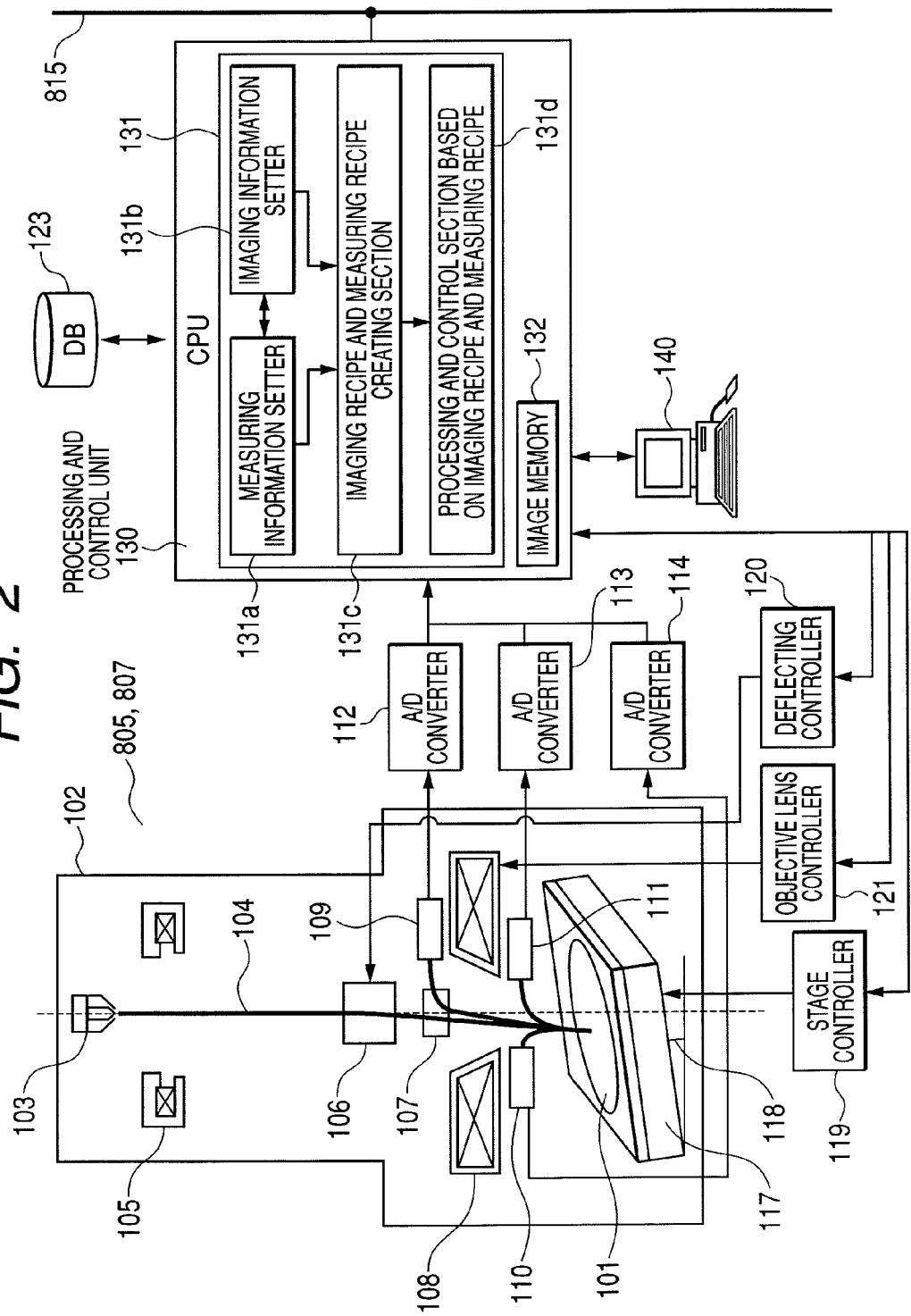
FIG. 2 is a block diagram showing a schematic configuration of a SEM system of the present invention.

Embodiments of a SEM (scanning electron microscope) system according to the present invention, the system having an automatic imaging and measuring function to automatically create an imaging recipe or/and measuring recipe in which imaging information or/and measuring information are to be designated, and acquire images using the imaging recipe or/and the measuring recipe, will be described below using FIGS. 1 to 9. Embodiments of a method which uses the above system to execute the above process will also be described.

1. Configuration in which Multiple SEM Systems are Applied to Semiconductor Device Manufacturing Equipment (Database Management and Sharing)

An embodiment of a configuration in which multiple SEM systems according to the present invention are applied to semiconductor device manufacturing equipment is described below using FIGS. 1A and 1B. Each of the SEM systems has an automatic imaging and measuring function to automatically create an imaging recipe or/and measuring recipe in which imaging information or/and measuring information are to be designated, and acquire images using the imaging recipe or/and the measuring recipe.

Reference number 801 in FIG. 1A denotes a mask pattern design device, 802 a mask drawing device, 803 a mask pattern optical processor, and 804 an etching device. Also, reference numbers 805 and 807 each denote a SEM system. Additionally, reference numbers 806 and 808 each denote a SEM controller that controls the SEM system. Furthermore, reference number 809 denotes an electronic design automation (EDA) tool server, 810 a database server, 811 database storage, 812 an arithmetic unit for image processing and for creation of imaging/measuring recipes, 813 an imaging/measuring recipe server, and 814 an evaluation tool server for created pattern shapes (e.g., this server conducts shape comparisons and the like between SEM image data and design data of a pattern to be evaluated). The above arithmetic unit and each of the above servers can exchange information via a network 815. A function that detects a critical point (hot spot) on a semiconductor pattern which requires inspection based on exposure simulation or the like is installed in the EDA tool server 809. A position of an EP is therefore determined using the EDA tool server 809, and is managed by the database server 810 having a connected database 811.

The database server 810 is adapted to manage the position of the EP and design data or the like, transmit the position of the EP and the design data or the like to a processing terminal 140 via the network 815, and allow data input. The database server 810 also has a database 811 connected thereto, which makes it possible to save or view a part or all of the following data in linked form with respect to product types, manufacturing processes, dates and time, and data acquisition devices: (a-1) imaging recipes and measuring recipes, (b-1) rules for generating each imaging recipe and each measuring recipe, (c-1) specifications required, (d-1) acquired images, and (e-1) measurement results, (f-1) results on imaging/measurement success/failure.

In addition, although, for example, two SEM systems, 805 and 807, are connected to the network 815 in FIG. 1A, it is possible in the present invention to share imaging recipes and measuring recipes between any number of SEM systems via the database server 810 or the imaging/measuring recipe server 813, and to operate the multiple SEM systems, namely, 805, 807, etc. up to one with the largest apparatus number, by executing the creation of an imaging recipe and an measuring recipe one time. Furthermore, sharing the database between these multiple SEM systems allows past processing results on imaging or measuring operations to be stored rapidly, and referring to the processing results is of use in later creating better imaging recipes and measuring recipes.

FIG. 1B shows another embodiment, in which the devices 806, 808, 809, 810, and 812 to 814 in FIG. 1A are integrated into a single unit 816. Any function is processable in split or integrated form in any number of devices, as in the present embodiment.

2. SEM

An embodiment of the SEM system 805, 807, . . . according to the present invention (this system includes the SEM controller 806, 808 or the integrated SEM control server and arithmetic unit 816) is described below using FIGS. 2 to 4.

2.1 SEM System Configuration

FIG. 2 is a block diagram showing a schematic configuration of a scanning electron microscope (SEM) system which acquires a secondary electron (SE) image or backscattered electron (BSE) image of a specimen in the present invention. The SEM image and the BSE image are collectively called the SEM image. The image acquired includes a part or all of a top-down image which has been obtained by irradiating the surface of a measurement object with electron beams from a perpendicular direction, or a tilt image that has been obtained by irradiating the object surface with electron beams from an oblique direction.

An electron gun 103 generates electron beams (primary electrons) 104, which are then converged by a condenser lens 105. The electron beam irradiating position and diameter on a semiconductor wafer 101, or the specimen placed on a stage 117, are then controlled by a deflector 106 and objective lenses 108 so that the semiconductor wafer 101 is irradiated with the electron beams focused at a given position on the wafer. Secondary electrons and backscattered electrons are emitted from the semiconductor wafer 101 that has been irradiated with the electron beams, and after being separated from an orbit of the irradiation electron beams by an ExB deflector 107, the secondary electrons are detected by a secondary electron detector 109. Meanwhile, the backscattered electrons are detected by backscattered electron detectors 110 and 111. The backscattered electron detectors 110 and 111 are installed in directions different from each other. The secondary electrons and backscattered electrons that have been detected by the secondary electron detector 109 and the backscattered electron detectors 110 and 111, respectively, are converted into digital signal form by A/D converter 112, 113, 114, then stored into an image memory 132, and undergo purpose-dependent image processing (or the like) in a CPU 131.

Figure 5:
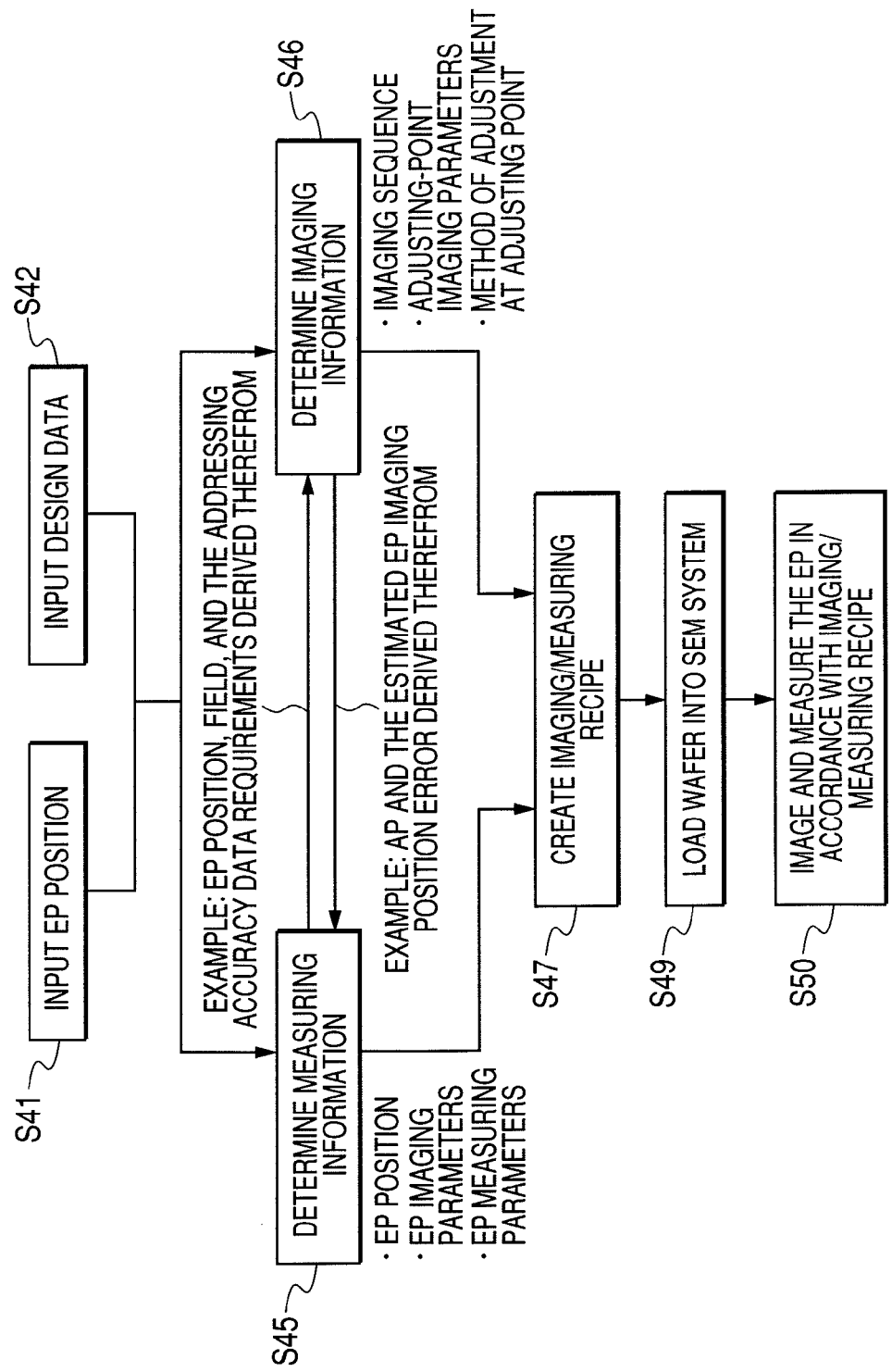
FIG. 5 is a flow diagram schematically showing a flow of an imaging or measuring process which uses a SEM system of the present invention.

As shown in FIG. 2, the CPU 131 is constructed to include the following functions: a measuring information setter 131a that executes the measuring information setting step S45 shown in FIGS. 5 and 6; an imaging information setter 131b that executes an imaging information setting step S46; an imaging recipe and measuring recipe creating section 131c that creates a measuring recipe based on the measuring information which has been determined by the measuring information setter 131a, and creates an imaging recipe based on the imaging information which has been determined by the imaging information setter 131b; and a processing and control section 131d that conducts an imaging control process and a measuring process upon the SEM system in accordance with the imaging recipe and measuring recipe that have been created by the imaging recipe and measuring recipe creating section 131c.

Figure 6A:
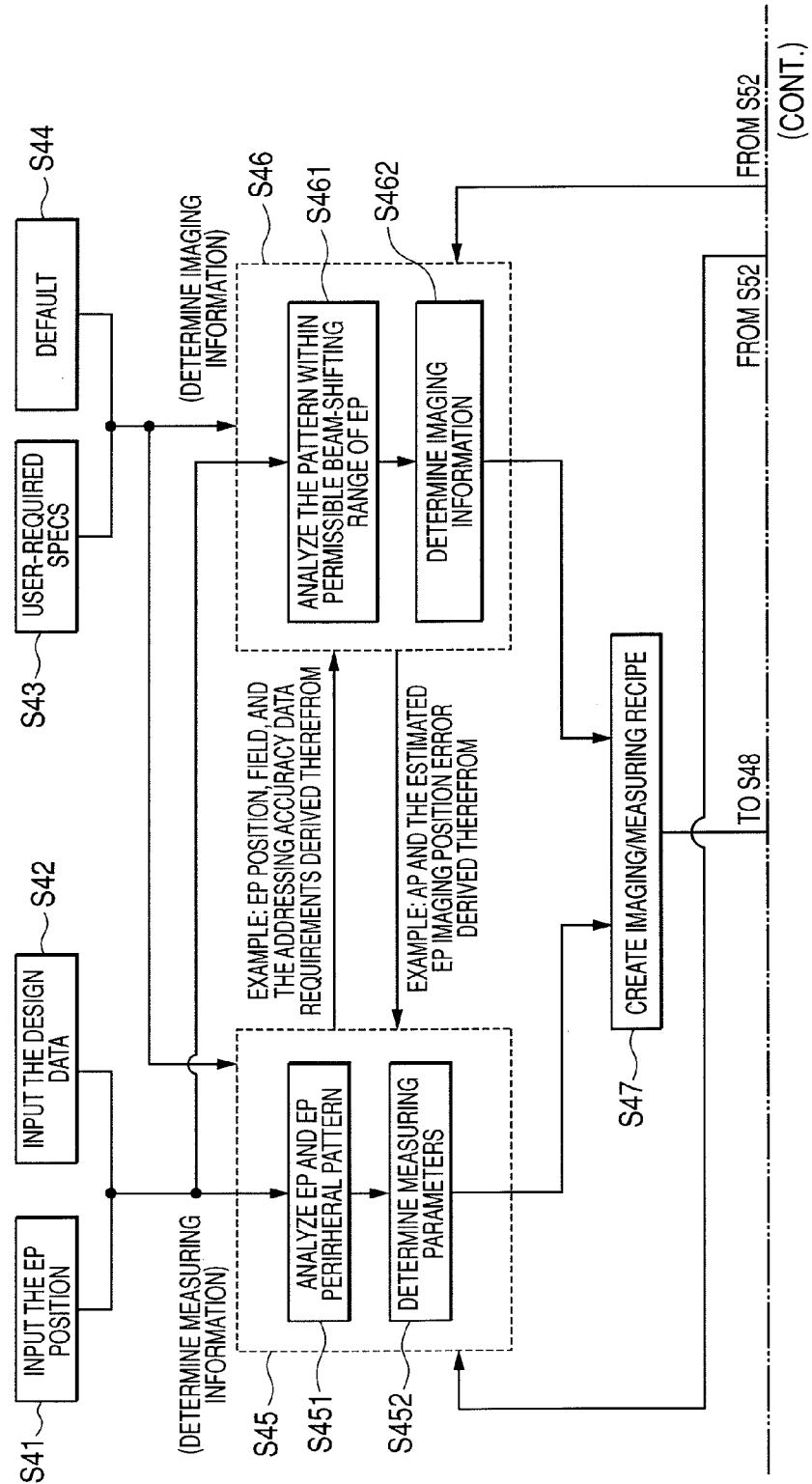
FIGS. 6A and 6B are a detailed flow diagram that shows details of the total flow of the imaging or measuring process which uses the SEM system of the present invention.
Figure 6B:
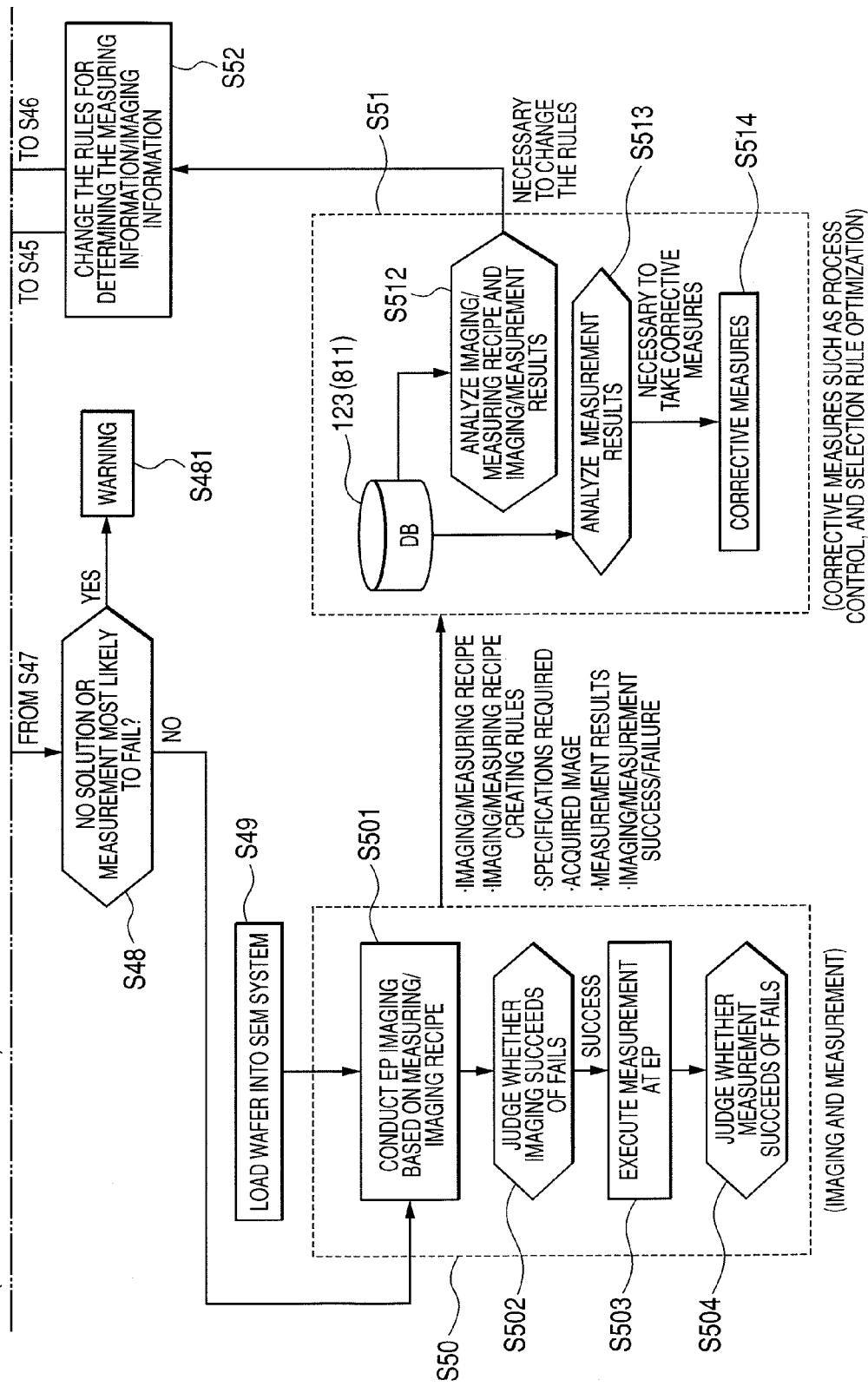

The CPU 131 is further constructed so that as shown in FIGS. 6A and 6B, coordinate data of an EP, and design data of a circuit pattern around the EP are input to the measuring information setter 131a and the imaging information setter 131b, and so that user-required specifications and default information preset (preloaded) in the system are further input to the setters 131a and 131b.

Figure 3A:
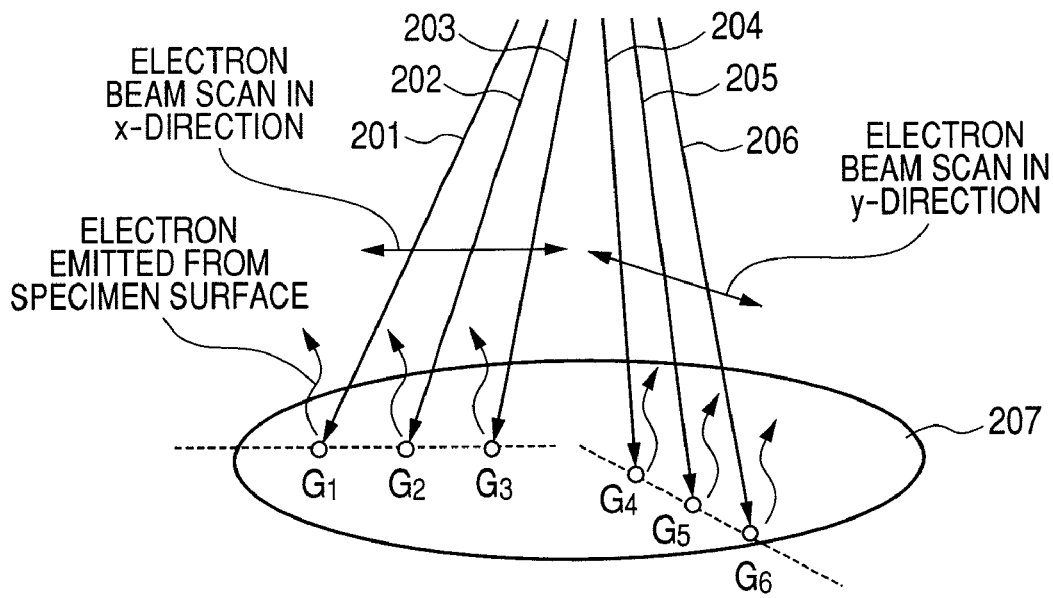
FIG. 3A is a diagram showing a state of electrons emitted from a semiconductor wafer when the surface of the semiconductor wafer is scanned by irradiation with an electron beam which has been focused using a SEM.
Figure 3B:
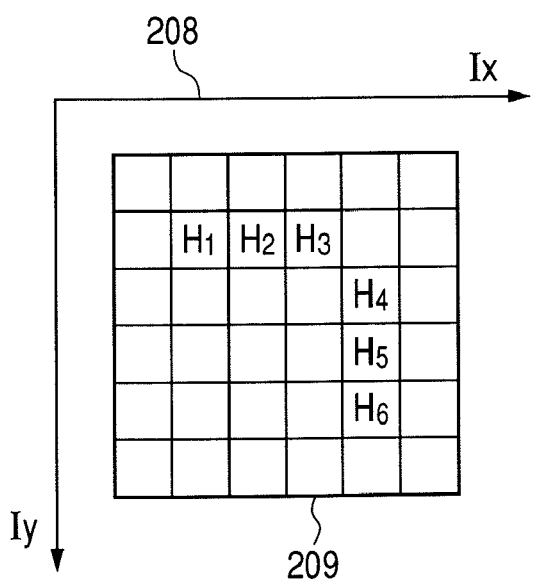
FIG. 3B is a diagram showing a method of converting into image form, signal quantities of electrons emitted from the semiconductor wafer.

FIG. 3 shows a method of converting into image form, signal quantities of the electrons emitted from the surface of the semiconductor wafer when the wafer surface is irradiated and scanned with electron beams. For example, as shown in FIG. 3A, the wafer surface is irradiated and scanned with electron beams 201 to 203 or 204 to 206, in an x- or y-direction, respectively. The scanning direction can be varied by changing a deflecting direction of the electron beams. Positions on the semiconductor wafer that have been irradiated and scanned with the electron beams 201 to 203 in the x-direction are denoted as G1 to G3, respectively. Similarly, positions on the semiconductor wafer that have been irradiated and scanned with the electron beams 204 to 206 in the y-direction are denoted as G4 to G6, respectively. The signal quantities of the emitted electrons at the positions G1 to G6 become brightness values of pixels H1 to H6, respectively, in the image 209 shown in FIG. 3B (subscripts 1 to 6 in G and H are associated with one another). Reference number 208 denotes a coordinate system that indicates the x- and y-directions on the image. An image frame 209 can be obtained by scanning a field interior with electron beams in this fashion. In addition, as a matter of fact, an image of a high S/N ratio can be obtained by scanning the field interior with electron beams several times in the same manner and then conducting additive averaging of the image frame obtained. The number of frames to be added is arbitrarily settable.

The processing and control unit (recipe arithmetic unit) 130 (812 or 816) that includes the processing terminal 140 of FIG. 2 (the control unit 130 may include the SEM controller 806, 808), or the like constitutes a computer system. The computer system sends control signals to a stage controller 119, a deflecting controller 120 (including an astigmatism correction coil controller), and an objective lens controller 121, to acquire images of an imaging point in accordance with an imaging recipe and a measuring recipe, or conducts image processing and/or other processing and control of the images acquired at any imaging point on the semiconductor wafer 101. The imaging point here includes a part or all of an addressing point (AP), an auto-focusing (AF) point, an automatic astigmatism (AST) correction point, an automatic brightness and contrast control (ABCC) point, or/and an evaluation point (EP).

Also, the processing and control unit (recipe arithmetic unit) 130 (812 or 816) or the like is connected to the processing terminal 140 (equipped with a display, a keyboard, a mouse, and other input and output devices) and has a graphic user interface (GUI) function that displays images and the like to a user or accepts input from the user. The XY stage 117 moves the semiconductor wafer 101 and enables image acquisition of the semiconductor wafer 101 at a given position thereon. Changing the imaging position by means of the XY stage 117 is called stage shifting, and changing the wafer-observing position by, for example, deflecting the electron beam by means of the deflector 106 (including an astigmatism correction coil), is called beam shifting. In general, stage shifting has the nature that it is wide in moving zone, but low in image acquisition positioning accuracy, whereas, conversely, beam shifting has the nature that it is narrow in moving zone, but high in image acquisition positioning accuracy.

While an embodiment with two detectors each for detecting a backscattered electron image is shown in FIG. 2, this number of backscattered electron image detectors can be reduced or increased.

The computer system (processing and control unit) 130 (812 or 816) or the like creates an imaging recipe and a measuring recipe by use of the method described later herein, and conducts imaging and measurements at the EP in accordance with the created imaging recipe and measuring recipe by controlling the SEM. For processing and control, part or all of such processing and control can also be allocated to a plurality of different processing terminals as shown in FIG. 1A. Details have been described using FIG. 1. Also, reference number 123 (811) denotes a database, which contains, in addition to coordinates of an observing position that become an input for the creation of the imaging recipe and the measuring recipe in the computer system (processing and control unit) 130 (812 or 816), design layout information (hereinafter, called the design data) of a semiconductor circuit pattern formed on the wafer 101. In the database 123, measurements results and the imaging recipe and measuring recipe that have been created in the computer system 130 can also be saved for sharing.

The methods available to obtain a tilt image of the measurement object existing when it is observed from any oblique direction using the SEM system 805, 807 shown in FIG. 2 include: (1) a scheme in which to acquire an oblique image by deflecting an irradiation electron beam via electron optics and irradiating the object at a tilt angle with the electron beam (this scheme is described in, for example, JP-A-2000-348658), (2) a scheme in which to incline the semiconductor wafer moving stage 117 itself (in FIG. 2, the stage is inclined at a tilt angle 118), (3) a scheme in which to mechanically incline the electron optics itself, and other schemes.

2.2 SEM Imaging Sequence

Figure 4A:
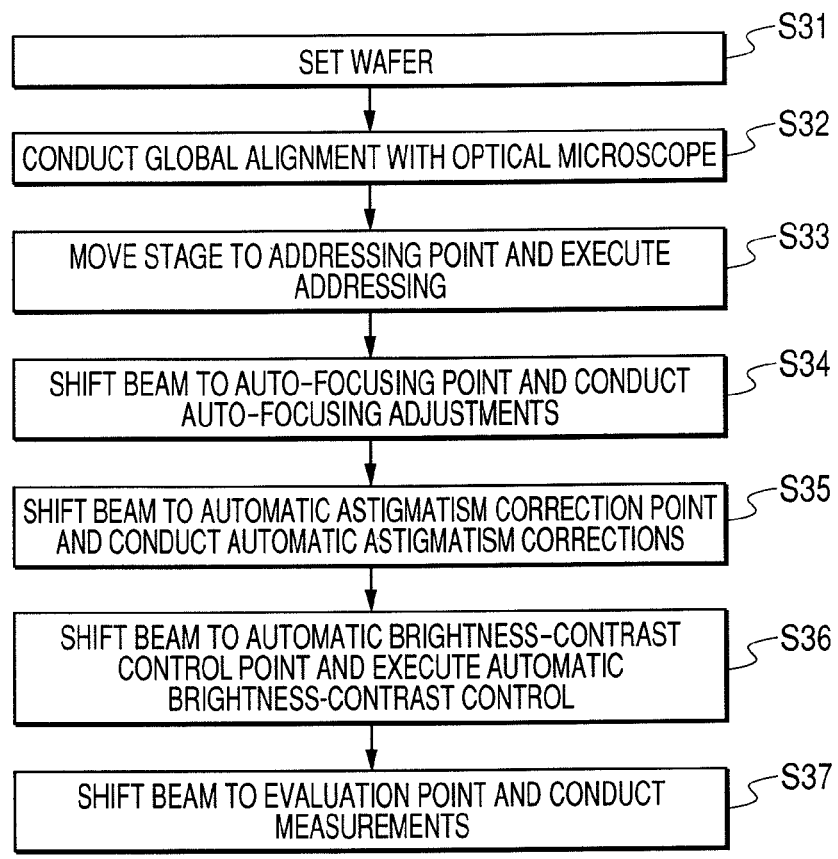
FIG. 4A is a flow diagram of an imaging sequence in a SEM system of the present invention.

A typical imaging sequence for observing any evaluation point (hereinafter, called the EP) is shown in FIG. 4A.

First, the semiconductor wafer that is a specimen is set up on the stage 117 of the SEM system in step S31 of FIG. 4A. In step S32, a global alignment mark on the wafer is observed through an optical microscope or the like to conduct corrections for an offset from a home position of the wafer, or for unusual rotations of the wafer.

In step S33, in accordance with the control and processing of the processing and control unit 130 or the like, the stage 117 is actuated to move the imaging position to the AP for imaging, then addressing parameters are calculated, and addressing based on the calculated addressing parameters follows. Addressing is described below. For EP observation, if stage shifting takes place in an attempt to directly observe the EP, positioning accuracy of the stage may cause significant shifting of the imaging point. Therefore, the processing and control unit 130 or the like temporarily shifts the stage 117 under the control thereof via the stage controller 119 in order to observe the AP to which coordinates of the imaging point and a template thereof (pattern of the imaging point; this pattern can be of a SEM image data format or a design data format) are preassigned for positioning. This template is already registered in the imaging/measuring recipe of the database 123 or of the imaging/measuring recipe server 813, so the template is hereinafter called the registered template.

The AP is selected from a peripheral region of the EP (this peripheral region is a permissible moving zone based on beam shifting). In addition, since the AP is generally of a low-magnification field size relative to that of the EP, it is substantially unlikely that all of the patterns within the registered template will overstep the field, even if the imaging position slightly shifts. Accordingly, the processing and control unit 130 or the like, for example, can estimate the amount of shifting in position of the imaging point at the AP, by matching the registered template of the AP and an actually acquired SEM image (actual-image template) of the AP. Since the coordinates of the AP and those of the EP are known, the processing and control unit 130 can then calculate an AP-EP relative displacement vector and can also estimate the amount of shifting in position of the imaging point at the AP, by the above matching process. By subtracting the above position error (the estimated amount of shifting in position) from the above amount of relative displacement, therefore, the processing and control unit 130 can confirm the relative displacement vector from the AP-imaging position to the EP, as the vector through which the imaging point is to be actually moved. As a result, the processing and control unit 130 or the like becomes able to image the EP with high coordinate accuracy by moving the imaging point by means of beam shifting of high positioning accuracy through the relative displacement vector under the control of the deflector 106 via the deflecting controller 120 in the SEM system.

It is desirable that the AP registered should satisfy conditions such as: (1) the AP needs to be a pattern present at a distance through which the imaging position is movable from the EP by beam shifting, and since there is a need to suppress contamination of the specimen surface with contaminants due to electron beam irradiation at the EP, the AP-imaging field of view (FOV) may need to be free from the EP-imaging FOV; and (2) the AP needs to have a characteristic pattern shape or brightness pattern, to allow easy matching between the registered template and the actual-image template, and not to easily cause erroneous matching.

Next, in step S34, under the control and processing of the processing and control unit 130, the imaging position is moved to the AF point by beam shifting and imaged. The processing and control unit 130 or the like calculates auto-focusing parameters and then conducts auto-focusing by, for example, controlling the objective lenses 108 via the objective lens controller 121 in the SEM system, pursuant to the calculated parameters.

It is desirable that the AF point registered should satisfy conditions such as: (1) the AF point needs to be a pattern present at the distance through which the imaging position is movable from the AP by beam shifting, and in order to suppress contamination at the EP, the FOV of the AF point needs to be free from the FOV of the EP; and (2) the AF point needs to have a pattern shape that allows easy detection of image blurring due to defocusing.

Next, in step S35, under the control and processing of the processing and control unit 130, the imaging position is moved to the AST point by beam shifting and imaged. The processing and control unit 130 or the like calculates automatic astigmatism correction parameters and then conducts automatic astigmatism corrections by controlling an astigmatism correction coil (not shown) and the objective lenses 108 via the astigmatism correction coil controller and objective lens controller 121 included in the deflecting controller 120 of the SEM system, pursuant to the calculated parameters.

It is desirable that the AST point registered should satisfy conditions such as: (1) the AST point needs to be a pattern present at the distance through which the imaging position is movable from the AP by beam shifting, and in order to suppress contamination at the EP, the FOV of the AST point needs to be free from the FOV of the EP; and (2) the AST point needs to have a pattern shape that allows easy detection of image blurring due to astigmatism.

Next, in step S36, under the control and processing of the processing and control unit 130, the imaging position is moved to the ABCC point by beam shifting and imaged. The processing and control unit 130 or the like calculates brightness and contrast correction parameters and then conducts automatic brightness and contrast adjustments upon the SEM system, pursuant to the calculated parameters. In order to acquire a clear and sharp EP image having appropriate brightness and contrast levels, parameters such as a voltage value of a photomultiplier in the secondary electron detector 109 are adjusted so that full contrast or near-full contrast can be obtained at the image signal portion of the highest level and at the image signal portion of the lowest level.

It is desirable that the ABCC point registered should satisfy conditions such as: (1) the ABCC point needs to be a pattern present at the distance through which the imaging position is movable from the AP by beam shifting, and in order to suppress contamination at the EP, the FOV of the ABCC point needs to be free from the FOV of the EP; and (2) to ensure appropriate brightness and contrast control of the image at the EP by use of the parameters adjusted for ABCC, the ABCC point needs to be a pattern similar to the pattern present at the EP.

Finally, in step S37, the imaging position is moved to the EP by beam shifting and imaged, and the SEM system conducts pattern dimensional measurements (and the like) using the determined measuring parameters.

Figure 4B:
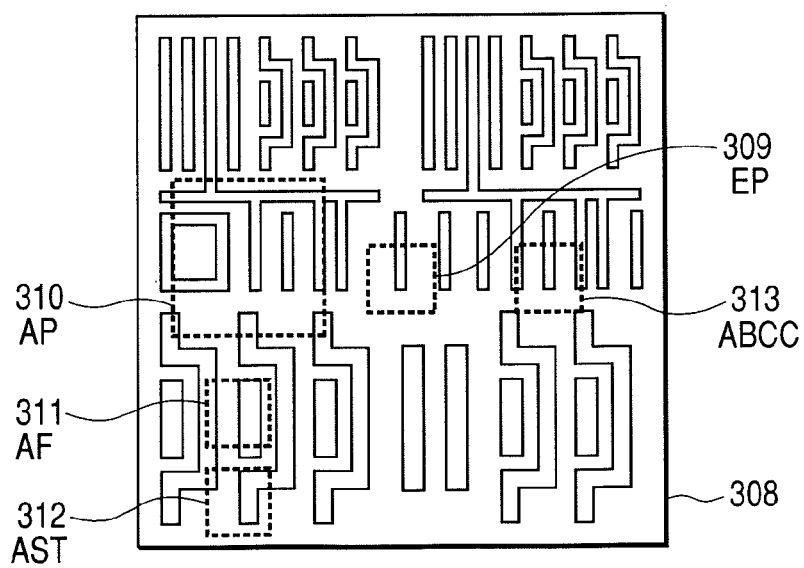
FIG. 4B is a plan view of a circuit pattern formed on the semiconductor wafer, and shows the circuit pattern and imaging points.

Examples of template positions of the EP 309, AP 310, AF point 311, AST correction point 312, and ABCC point 313 on the allowable beam-shifting region from the EP are each shown in dotted-line frame form in FIG. 4B. There can be several variations on execution of steps S33, S34, S35, and S36. For instance, depending on the particular situation, part or all of these steps may be omitted, or an execution sequence thereof may be arbitrarily changed, or the EP, the AP, the AF point, the AST correction point, and the ABCC point may overlap in coordinates (e.g., auto-focusing and automatic astigmatism correction may be conducted in the same place).

The imaging recipe and the measuring recipe include (1) measuring information, (2) imaging information, and (3) registered templates (especially, an addressing template concerning the AP, a measuring-position identification template concerning the EP, and other templates).

The measuring information mentioned above collectively refers to three items: (1a) the position of the EP, (1b) the imaging parameters for the EP (i.e., the field size, the imaging magnification, the number of frames added, the electron beam scanning direction, the electron beam accelerating voltage, the electron beam probing current, and/or the like), and (1c) the measuring parameters for the EP (i.e., the section to be measured in the EP field, the kind of dimension to be measured, the measuring cursor setup method, and the measuring method/measuring parameter data).

Also, the above-mentioned imaging information collectively refers to: (2a) the imaging sequence (the positions of each adjusting point, namely, the AP, the AF point, the AST point, and the ABCC point, and an order of imaging each adjusting point), (2b) imaging parameters for each adjusting point, and (2c) methods of adjustment at each adjusting point (i.e., the addressing scheme, or the auto-focusing control scheme, or the automatic astigmatism correction scheme, or the automatic brightness and contrast control scheme, or other processing parameters).

In addition, the evaluation point (EP) and each adjusting point (the AP, the AF point, the AST point, and the ABCC point) are referred to collectively as the imaging point.

3. Automatic Creation of an Imaging Recipe and a Measuring Recipe

To minimize a recipe-creating time and reduce an operator load, it is absolutely necessary to improve an automation ratio. To this end, the present invention is a method and system adapted to be able to create automatically the imaging recipes and measuring recipes having performance equal to or higher than that of the imaging recipes and measuring recipes manually created by the operator. Furthermore, in order to create better imaging recipes and measuring recipes in many cases, the present invention systematically incorporates, in addition to other information contained in predefined measuring information, the above-described imaging information and the specifications required with respect to measuring accuracy, throughput, image quality, and the like.

3.1 Outline

The process flow of creating an imaging recipe and a measuring recipe in the processing and control unit 130 or image processing/imaging and measuring recipe creating arithmetic unit 812, 816, or the like, is outlined below using FIG. 5. First, the position of the EP and the design data for the semiconductor circuit pattern are input to, for example, the processing and control unit 130 or image processing/imaging and measuring recipe creating arithmetic unit 812, 816, or the like. The position of the EP and the design data for the semiconductor circuit pattern are further input to the database 123 or the database server 810, 816, and stored into the database 811. These operations are conducted in steps S41 and S42. In step S46, the present invention determines the imaging information, that is, (2a) the image sequence, (2b) the imaging parameters for each adjusting point, and (2c) the adjusting methods for each adjusting point, by using the above-input EP position and design data and other measuring information obtained in step S45.

Also, the present invention is adapted so that in step S45, measuring information to be used therein is not only given by the user, but also estimated from the design data at the input EP. For example, in step S45, the kind of dimension to be measured that is one constituent element of the measuring information is estimated from the design data, then after the X- and Y-direction independent EP-imaging position error tolerances required for the measurement at the EP have been calculated from the estimated kind of dimension to be measured, the X- and Y-direction independent values required of the addressing accuracy at the AP inversely calculated from the above tolerances are calculated, and the above two calculated sets of tolerance values are supplied for processing in step S46. The AP that satisfies the addressing accuracy data required can be determined in step S46.

Additionally, the present invention is characterized in that in step S45, conversely, the invention determines the measuring information, that is, (1a) the position of the EP, (1b) the imaging parameters for the EP, and (1c) the measuring parameters for the EP, from the imaging information obtained in step S46 (e.g., the AP position and the EP-imaging position error estimated therefrom), as well as from the input EP position and design data. For example, in step S46, estimated data of the X- and Y-direction addressing accuracy at the AP is first calculated from AP candidates that form a part of the imaging information, estimated data of the X- and Y-direction EP-imaging position shifts at the EP is next calculated from the above calculation results, and the two sets of calculation results are supplied for processing in step S45. Thus, modification of the measuring parameters, inclusive of spreading the field of the EP, becomes possible so that the measurement will be successful, even with the estimated X- and Y-direction EP-imaging position shifts.

Modification of the measuring information in step S45 is likely to increase variations on the imaging information selectable in step S46. For example, as in the foregoing embodiment, spreading the field of the EP in step S45 may lower the addressing accuracy data required, and in step S46, may increase the AP candidates that satisfy the addressing accuracy data required. Conversely, if an AP very high in addressing accuracy is selected in step S46, the field of the EP may be narrowed (the magnification may be raised) for enhanced image resolution and hence for improved measuring accuracy. In this fashion, the processing and control unit 130 or the image processing/imaging and measuring recipe creating arithmetic unit 812, 816 or the like executes steps S45 and S46 repeatedly, and in step S47, creates better imaging recipes and measuring recipes in mutually optimized form, and stores the created imaging recipes and measuring recipes into the database 123, the database server 810, or the imaging/measuring recipe server 813.

After an imaging recipe and a measuring recipe have thus been created in the processing and control unit 130 or the image processing/imaging and measuring recipe creating arithmetic unit 812, 816 or the like, and stored into the database 123, the database server 810, or the imaging/measuring recipe server 813, the desired SEM system 805, 807 loads a wafer in step S49 and then in step S50, images and measures the EP on the basis of the stored imaging recipe and a measuring recipe. That is to say, the imaging recipe and the measuring recipe are loaded into the SEM controller 806, 808 or the shape evaluation tool server 814, and executed.

3.2 Details

Details of the process flow in the present invention are described below using FIGS. 6A and 6B to supplement the above description given per FIG. 5 (FIG. 5 is a simplified form of FIGS. 6A and 6B).

During the determination of measuring information and imaging information in steps S45 and S46, (a-2) a part or all of the information designated in the imaging recipe and the measuring recipe, (b-2) the X- and Y-direction independent EP-imaging position error tolerances, (c-2) the X- and Y-direction independent addressing accuracy data required at the AP, and (d-2) a part or all of the measuring accuracy, throughput, and image quality data required are input as the user-required specifications (step S43) by, for example, using a GUI function 900 (in FIGS. 9A and 9B) of a processing terminal connected to the processing and control unit 130 or the image processing/imaging and measuring recipe creating arithmetic unit 812, 816 or the like. The processing and control unit 130 or the image processing/imaging and measuring recipe creating arithmetic unit 812, 816 or the like can then determine measuring information and imaging information from the input user specifications requirements. In addition, default data of the information preloaded within the system can be input in step S44 as a part or all of the information shown in above items (a-2) to (d-2). A plurality of kinds of default data can be provided, for example, on a product-type and/or process-by-process basis, for the wafers that are to be inspected.

The determination of measuring information in step S45 (S452) includes design-data-based analysis of the EP and the peripheral pattern thereof (step S451). During the pattern analysis in step S451, the kind of dimension data to be measured at the EP (a further detailed description is given later herein using FIG. 7), and continuity and cyclicity of the pattern shape around the EP (a further detailed description is given later herein using FIG. 8) are estimated to calculate the EP-measuring parameters and the X- and Y-direction independent EP-imaging position error tolerances. The kind of dimension data to be measured refers to the kind and measuring method of critical point on the semiconductor pattern to be inspected. Further details are described later using FIG. 7.

The determination of imaging information in step S46 (S462) includes the analysis of the pattern in the allowable beam-shifting zone from the EP (step S461). The pattern analysis in step S461 includes steps such as: evaluating adequacy levels of the arbitrary regions selected as adjusting points (the AP, the AF point, the AST correction point, and the ABCC point) from the design data within the allowable beam-shifting zone, and if the AP is selected, estimating addressing accuracy from the pattern included in the selected AP.

In addition, in step S48, the processing and control unit 130 or the image processing/imaging and measuring recipe creating arithmetic unit 812, 816 or the like can pre-evaluate whether the imaging recipe and measuring recipe that were created in step S47 satisfy the specifications requirements or the estimated specifications requirements or the user-required specifications, or pre-evaluate a risk level of failure in imaging or measuring. If any problems are present, the above unit can prompt the user, for example, via the GUI, to review the recipe in step S481.

In this way, after the imaging recipe and the measuring recipe have been created in, for example, the processing and control unit 130 or the image processing/imaging and measuring recipe creating arithmetic unit 812, 816 or the like, and stored into the database 123, the database server 810, or the imaging/measuring recipe server 813, the wafer is actually imaged and measured in accordance with the imaging recipe and the measuring recipe by using the desired SEM system, and results are stored into the database 123 or 811 (step S50). In step S501 or S502 of imaging and measuring step S50, the processing and control unit 130 or the image processing/imaging and measuring recipe creating arithmetic unit 812, 816 or the like conducts a processing success/failure judgment with each execution cycle of imaging (step S501) or measuring (step S502), respectively. After that, a part or all of (a-1) the imaging recipe and the measuring recipe, (b-1) the imaging recipe and measuring recipe creating rules, (c-1) the specifications requirements, (d-1) the acquired image(s), (e-1) the measurement results, and (f-1) the imaging/measuring success/failure judgment results are stored into database 123 or 811 for management.

In step S51 of undertaking corrective measures (such as process control) and optimizing selection rules, the processing and control unit 130 or the image processing/imaging and measuring recipe creating arithmetic unit 812, 816 or the like executes step S513 to further analyze measurement results relating to a successfully imaged/measured sample, on the basis of the database 123 or 811. As required, analytical results are next fed back into the parameters for mask pattern shape correction in the mask pattern design device 801 and the mask pattern drawing device 802, and into the semiconductor-manufacturing process parameters of the semiconductor-manufacturing devices 803 and 804 (step S514). A high yield is thus achieved. Meanwhile in step S51, the processing and control unit 130 or the image processing/imaging and measuring recipe creating arithmetic unit 812, 816 or the like analyzes, in step S512, imaging/measuring recipes and measurement results relating particularly to an unsuccessfully imaged/measured sample, on the basis of the database 123 or 811, and in step S52, conducts necessary changes upon the measuring information and imaging information determination rules, based on results of the above analyses. The rules are thus enhanced in accuracy.

3.2.1 Kind of Dimension to be Measured

The foregoing kind of dimension to be measured is described in further detail below using FIG. 7. Reference number 600 denotes the X-Y coordinate system in FIG. 7. Reference numbers 601, 606, 610, 614, 620, 623, 627, and 631 in FIG. 7 denote patterns present in the field of the EP. The kind of dimension to be measured is assumed to be, for example, line width measurement of a line pattern 602 (FIG. 7A), measurement of a gap between line patterns 607 and 608 (FIG. 7B), measurement of a gap between an end cap of a line pattern 611 and a line pattern 612 (FIG. 7C), diameter measurement of contact holes 615 and 621 (FIGS. 7D and 7E, respectively), major axial/minor axial length measurement of a pattern 624 (FIG. 7F), measurement of a distance between line patterns 628 and 629 (FIG. 7G), and measurement of a shape of a pattern 632 (FIG. 7H; especially, a shape of the corner shown with a dotted-line frame 633). Dotted-line frame and arrow sets 603, 609, 613, 616 to 619, 622, 625, 626, and 630 in FIGS. 7A to 7G each denote a measuring cursor and a section to be measured. In FIG. 7A, for example, a measuring cursor is placed near both edges of the line pattern, peak positions 605 of both left and right white bands in a SEM signal profile 604 between sections A and B are detected, and the dimension between the peaks is measured as line width. Although the peak-to-peak dimension in the SEM signal profile 604 is measured as line width in the present embodiment, which positions in the profile are to be selected for line width measurement may depend upon the situation (e.g., positions of X % brightness levels relative to the highest and lowest brightness levels on both white bands may be determined and a dimension between the determined positions may be measured). In addition, a profile obtained by, for example, executing additive averaging of the SEM signal through the measuring cursor control zone of distance (637) in the y-direction to enhance an S/N ratio can be used as the SEM signal profile 604.

In FIG. 7D, in order to measure average hole diameter, a measuring cursor is disposed in several places (in the example of FIG. 7D, four places, 616 to 619) around a hole, and a process such as calculating measured average diameter is conducted. A diametral value 622 that was measured in one place, as in FIG. 7E, can be used as typical hole diameter.

In FIG. 7H, a close shape gap 636 between a pattern 634 on a SEM image in the enlarged view of a region 633, shown in FIG. 7I, and design data 635 displayed in overlaid form on the pattern 634 of the SEM image, is calculated to evaluate a finish of a two-dimensional pattern profile.

The above estimation of the kind of dimension to be measured makes it possible to estimate the section to be measured and the region required for the measurement, and hence to estimate the measuring parameters and the X- and Y-direction independent EP-imaging position error tolerances. For example, even if the imaging position error in the y-direction is significant and thus the actually imaged field shown as a boldface frame 638 deviates with respect to the field 606 designated in FIG. 7B, when line patterns 607 and 608 extend downward, gaps between the line patterns 607 and 608 can be measured. Of course, it is desirable that measurements be conducted at a point 609 present centrally near the designated EP, but if there is no appropriate AP applicable to addressing with respect to the point 609, it is conceivable that the above out-of-field state will be acceptable in compromise with the specifications of the measuring information.

In contrast, if the imaging position error in the x-direction is significant and thus the actually imaged field shown as a frame 639 deviates with respect to the field 606 designated in FIG. 7B, the line pattern 607 lies outside the field and this state is an unacceptable imaging error since it will be impossible to make the measuring process successful for the line pattern gap measurement that is the estimated kind of dimension to be measured. If the actually imaged field shown as a frame 640 deviates with respect to the field 610 designated in FIG. 7C, although an arrow 613 indicating the gap between the end cap of the line pattern 611 to be measured and the line pattern 612 is barely included in the field, when consideration is given to the disposition of the measuring cursor and to a process such as SEM signal profile averaging in the measuring cursor region for improved S/N ratio, the measurement is most likely to fail since the pattern around the section to be measured is significantly offset from the field. In terms of these several factors, therefore, the X- and Y-direction independent EP-imaging position error tolerances can be estimated by estimating the kind of dimension to be measured.

3.2.2 Creation of an Imaging Recipe and a Measuring Recipe

An example of creating an imaging recipe and measuring recipe realized by the present invention is described below using FIG. 8. Reference number 701 denotes the X-Y coordinate system shown in FIG. 8.

Figure 8A:
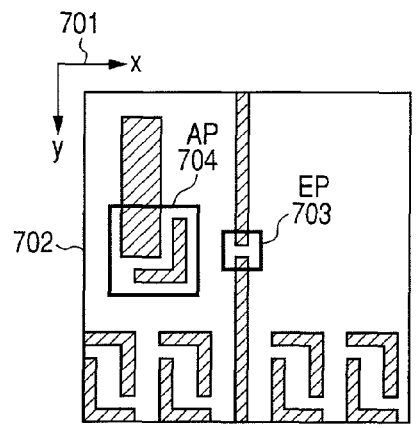
FIG. 8A is a diagram that shows EP and AP on a pattern formed on a specimen.

FIG. 8A shows a typical imaging sequence. In this sequence, the field of view is first moved by stage shifting to an AP 704 that is a pattern present in a region 702 allowing the field to be moved to an EP 703 by beam shifting, and this pattern has uniqueness with respect to both X- and Y-directions (i.e., this pattern allows position coordinates to be identified with respect to both X- and Y-directions by template matching). After the completion of addressing at the AP 704, the field is further moved to the EP 703 by beam shifting to correct any X- and Y-direction independent imaging position errors due to stage shifting, and a measurement is conducted at the EP 703. The kind of dimension to be measured at the EP 703 is, for example, gap measurement between upper and lower line patterns.

Figure 8B:
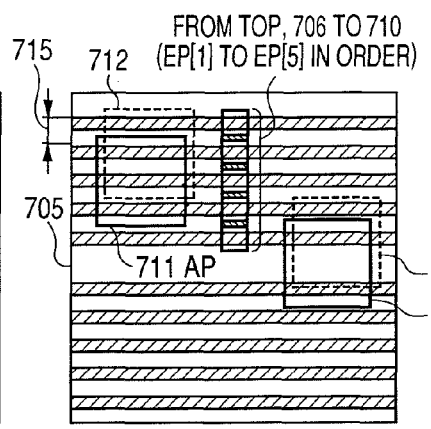
FIG. 8B is a plan view of a specimen having line pattern groups each formed with five line patterns, and is a diagram showing a sequential imaging state of the five line patterns.
Figure 8C:
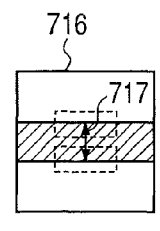
FIG. 8C is a plan view of a line pattern, showing a measuring cursor and a measuring target section at the EP on the line pattern.

FIG. 8B shows an example of measuring the line widths of five line patterns in order. From top, five EPs, 706 to 710, are set up (these EPs are called EP [1] to EP [5], respectively). A measuring cursor disposed at one of the EPs, and a section to be measured at the particular EP are shown in FIG. 8C. It can be seen that an AP applicable to addressing with respect to EP [1] to EP [5], in both X- and Y-directions, is absent in the range 705 shown in the figure.

For example, even if AP candidates 711 and 713 both go out of field in the X-direction, this out-of-field state cannot be detected because of no change in pattern shape. The present example, therefore, provides no solution in an AP selection rule of selecting an AP applicable to addressing in both X- and Y-directions.

However, as in the examples of acceptable and unacceptable field-offset directions that are described using FIG. 7B, the kind of measurement in the present example makes an appropriate AP selectable by considering the fact that even if a slight imaging position error occurs in the X-direction, line width measurement is possible, and the fact that since an imaging position error in the Y-direction causes the five line patterns to shift in measuring position and can thus cause line pattern measuring failures, the imaging position error in the Y-direction is unacceptable.

That is to say, the AP 713, for example, is selected if AP selection uses a rule of ignoring the uniqueness of any APs in the X-direction and attaching importance only to the uniqueness of APs in the Y-direction. Since the AP 713 has a template including a region in which the line pattern spacing in the Y-direction is wider than any other, even if a field offset occurs and a region 714 is actually imaged in attempt to image the AP 713, the field offset in the Y-direction can be detected accurately.

In contrast, if the AP 711 is selected, even if a field offset results in actual imaging being conducted at an AP 712, since this pattern is the same as the AP 711, the field offset cannot be detected.

Thus, in the EP and EP peripheral pattern analysis step S451 of the measuring information determination step S45 shown in FIGS. 6A and 6B, it is possible, by analyzing the EP pattern and EP peripheral design data pattern that have been input from the database 123 or 811, to estimate, for example, the kind of dimension to be measured, calculate, from the estimated kind of dimension to be measured, the X- and Y-direction independent EP-imaging position error tolerances required for the measurement at the EP, further calculate the X- and Y-direction independent addressing accuracy data requirements for AP inversely calculated from the above-calculated tolerances, and supply these estimation and calculation results to imaging information determination step S46. In step S461 of imaging information determination step S46, the appropriate AP that satisfies the addressing accuracy data required can be selected in imaging information determination step S462 by analyzing patterns present in the permissible beam-shifting zone from the EP. Incidentally, if a cyclic period 715 of a line pattern in the Y-direction is much larger than the estimated positioning error associated with stage shifting, the AP candidate 711 could also be a solution since addressing with one cycle of shifting is unlikely.

Figure 8D:
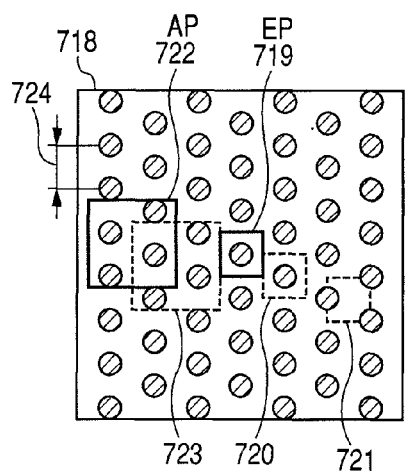
FIG. 8D is a plan view of a region with a number of contact holes formed thereon, and is a diagram showing a state in which diameters of the contact holes are measured in the region.
Figure 8E:
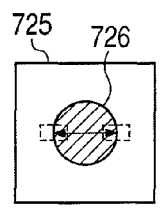
FIG. 8E is an enlarged view of the EP 719, showing the measuring cursor and the measuring target section.

FIG. 8D shows an example of measuring a diameter of a contact hole 719 in a region having a successive arrangement of contact holes. A measuring cursor at an EP 719, and a section to be measured thereat are shown in FIG. 8E. If contact hole spacing (pattern cyclic period) 724 is smaller than a positioning error due to stage shifting, an AP applicable to addressing with respect to the EP 719, in both X- and Y-directions, is absent, as in the example of FIG. 8B. In addition, in the present example, contact holes are arranged at equal spatial intervals in both X- and Y-directions, so an AP applicable to addressing in one of the two directions is not present, either. Therefore, although offset-free imaging of the EP 719 cannot be ensured, even if an imaging position error equivalent to several cyclic periods of the pattern occurs, AP selection is possible, provided that the operator can compromise in that it is good enough just to be able to measure the diameter of any one contact hole present around the EP 719.

Figure 8G:
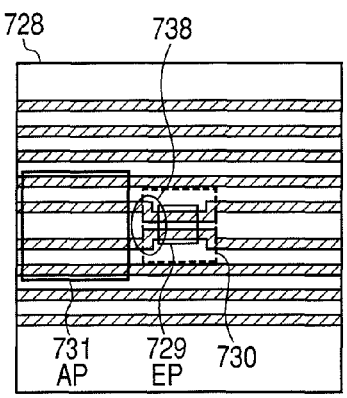
FIG. 8G is a plan view of line patterns, showing a case in which the EP is a gap present between two proximate line patterns.
Figure 8F:
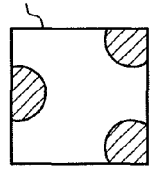
FIG. 8F is a plan view of the specimen, showing a state in which a few contact holes are outside a viewing field.
Figure 8H:
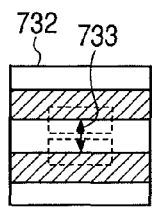
FIG. 8H is a diagram showing the measuring cursor and measuring target section existing when the gap between the two proximate line patterns is measured.

Incidentally, unless the AP is set because an imaging position error in the X- or Y-direction is acceptable, this can cause such a field offset as in FIG. 8F (corresponding to 721 in FIG. 8D), resulting in no contact hole diameters being measurable. An AP 722, for example, is therefore set. For the AP 722, even if a field offset causes a region 723 to be actually imaged in an attempt to image the AP 722, the cyclic periods of field offset of the pattern cannot be corrected. However, half a period or less of offset is correctible. Accordingly, if the region 723 shifted by one period is addressed with respect to the AP 722, the imaging position of the EP will also a region 720 shifted by one period with respect to 719, but the measurement will be successful since the contact holes in the foregoing region can be captured centrally in the field of view.

In this fashion, if an EP and a similar pattern around the EP are cyclically formed on the wafer, X- and Y-direction independent EP-imaging position error tolerances can each be a combination of: a cyclic period, a permissible number of cyclic periods of imaging position shift, and a permissible amount of imaging position shift at the imaging position offset by the permissible number of cyclic periods of imaging position shift.

In other words, in the EP and EP peripheral pattern analysis step S451 of the measuring information determination step S45 shown in FIGS. 6A and 6B, it is possible, by analyzing the EP pattern and EP peripheral design data pattern that have been input from the database 123 or 811, to estimate the kind of dimension to be measured, whether the EP and the EP peripheral pattern are cyclically formed, and the cyclic period of the pattern, calculate estimation results on the kind of dimension to be measured, on whether the EP and the EP peripheral pattern are cyclically formed, and on the cyclic period of the pattern, a permissible imaging position shift period and a permissible imaging position error level, further calculate the X- and Y-direction independent addressing accuracy data requirements for AP inversely calculated from the above-calculated permissible imaging position shift period and permissible imaging position error level, and supply these estimation and calculation results to imaging information determination step S46. In step S461 of imaging information determination step S46, the estimated EP-imaging position error level can be calculated by analyzing patterns present in the permissible beam-shifting zone from the EP. It is further possible, by supplying calculation results on the estimated error level to measuring information determination step S45, to make measurements successful in step S45 by conducting the measuring information changes that include changing the position of the EP.

In this way, it is possible, by estimating, from the EP and the EP peripheral design data, the kind of dimension to be measured, whether the EP and the EP peripheral pattern are cyclically formed, and the cyclic period of the pattern, to conduct the measuring information changes that include EP position changes, based on the permissible imaging position shift period and the permissible imaging position error level. Measurements can be consequently made successful.

Figure 8I:
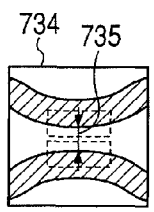
FIG. 8I is a diagram that shows a state in which the two line patterns in close proximity to each other in FIG. 8G are formed into a round shape under an influence of OPC.
Figure 8J:
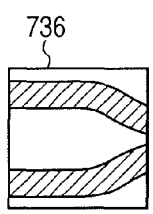
FIG. 8J is a diagram showing a state in which a pattern to be observed is shifted in an X-direction of the viewing field.

FIG. 8G shows an example of measuring a gap between two line patterns in close proximity to each other centrally in a region 728. A measuring cursor at an EP 729, and a section to be measured 733 thereat are shown in region 732 of FIG. 8H. The patterns actually formed would be of a round shape under an influence of an optical proximity effect (OPE) or the like, and could appear as shown in FIG. 8I.

The present example is intended to measure the gap in a place having the above two proximate line patterns, so addressing in the X-direction is important. However, as represented by AP candidate 731, for example, there are no AP candidates in the present example that have uniqueness with respect to the X-direction in region 728 (it is possible to set AP so as to overlap on the region in which the pattern shape changes with respect to the X-direction shown with a round frame 738 in the figure, but if the AP too much approaches the EP, contamination of the EP with contaminants during AP imaging is likely, so a case in which a neighboring region of the EP is excluded from AP selection is considered here). For this reason, the viewing field of the EP 729 is liable to shift in the X-direction, as expressed by 736 in FIG. 8J, and thus to result in the gap measurement being impossible.

Figure 8K:
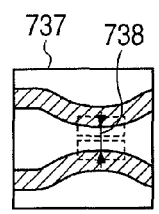
FIG. 8K is a diagram showing a state in which, even when the pattern to be observed is slightly shifted from a central section of the field, the section to be measured stays within the field.

Accordingly, such limits of the addressing accuracy (i.e., estimated values of a field offset likely to occur at the EP; for example, estimated addressing error+estimated beam-shifting error at the AP) are fed back from imaging information determination step S46 to measuring information determination step S45, and the field of the EP, for example, is spread as shown with a dotted-line frame 730. This makes it possible, as shown in FIG. 8K, to maintain a desired measurement target section fully in the field, even in the event of a slight field offset, and hence to render the measurement successful (field 729 corresponds to field 737; reference number 738 denotes the measuring cursor and the section to be measured). During the determination of a horizontal field-spreading size in step S45, consideration is given to trade-offs between the estimated data of a field offset likely to occur at the EP, and changes in measuring accuracy due to the spreading of the field.

As illustrated by more specific examples in FIG. 8, in steps S45 and S46, the processing and control unit 130 or the image processing/imaging and measuring recipe creating arithmetic unit 812, 816 or the like estimates the measuring information ((1a) the position of the EP, (1b) the imaging parameters for the EP, and (1c) the measuring parameters for the EP), the imaging information ((2a) the imaging sequence, (2b) the imaging parameters for each adjusting point, and (2c) methods of adjustment at each adjusting point), EP-imaging position errors, AP-addressing accuracy, and other information, and then while systematically adding measuring accuracy, throughput, image quality, and other specifications required, cross-refers to and optimizes the above information. Better imaging recipes and measuring recipes can thus be calculated at a high automation ratio.

4. GUI

An example of a GUI for setting or displaying input and output information in the present invention is described below using FIGS. 9A and 9B. The GUI is constructed in the processing terminal 140 connected to the SEM system 805, 807. Various information drawn in a window 900 of FIGS. 9A and 9B can be displayed in one screen or in split form on a display device or the like. Also, the symbol "*" in FIGS. 9A and 9B indicates any numeric value (or character string) or numeric data range that has been input to the system.

The specifications required for the imaging recipe and the measuring recipe are input to windows 914 and 915 as necessary. These specifications include, for example, measuring accuracy, throughput, image quality, and positioning accuracy. When specific numeric data is called for, the numeric data is input to the window 914, and when weighting to which importance is to be attached is designated for each requirement item, the weighting value is input to the window 915.

Windows 919 and 935 make an EP-based display of information on evaluation points (EPs) and on adjusting points (an AP, an AF point, an AST correction point, and an ABCC point). IDs of the EPs are sequentially displayed in a vertical direction. The following describes display of the EP whose ID is '1':

Design data of the EP or a SEM image thereof is displayed in a window 920. A measuring cursor and a section 922 to be measured or an electron beam scanning direction 921 suitable for measurement of the kind of dimension to be measured can also be displayed.

Central position, imaging parameter, and measuring parameter data (928) of the EP, measuring accuracy tolerance and estimated data (929), and EP-imaging position error tolerance and estimated data (930) can be displayed in a window 927.

Positions, imaging parameters, measuring parameters, and adjusting methods (939) of each adjusting point, the presence/absence of each adjusting point (displayed with a checkbox 937, 941, 945), imaging sequences (list of display of AP1, AP2, and AF), and adjusting-point imaging position error tolerance and estimated data (940, 944, 948) can be displayed in a window 936.

Figure 9A:
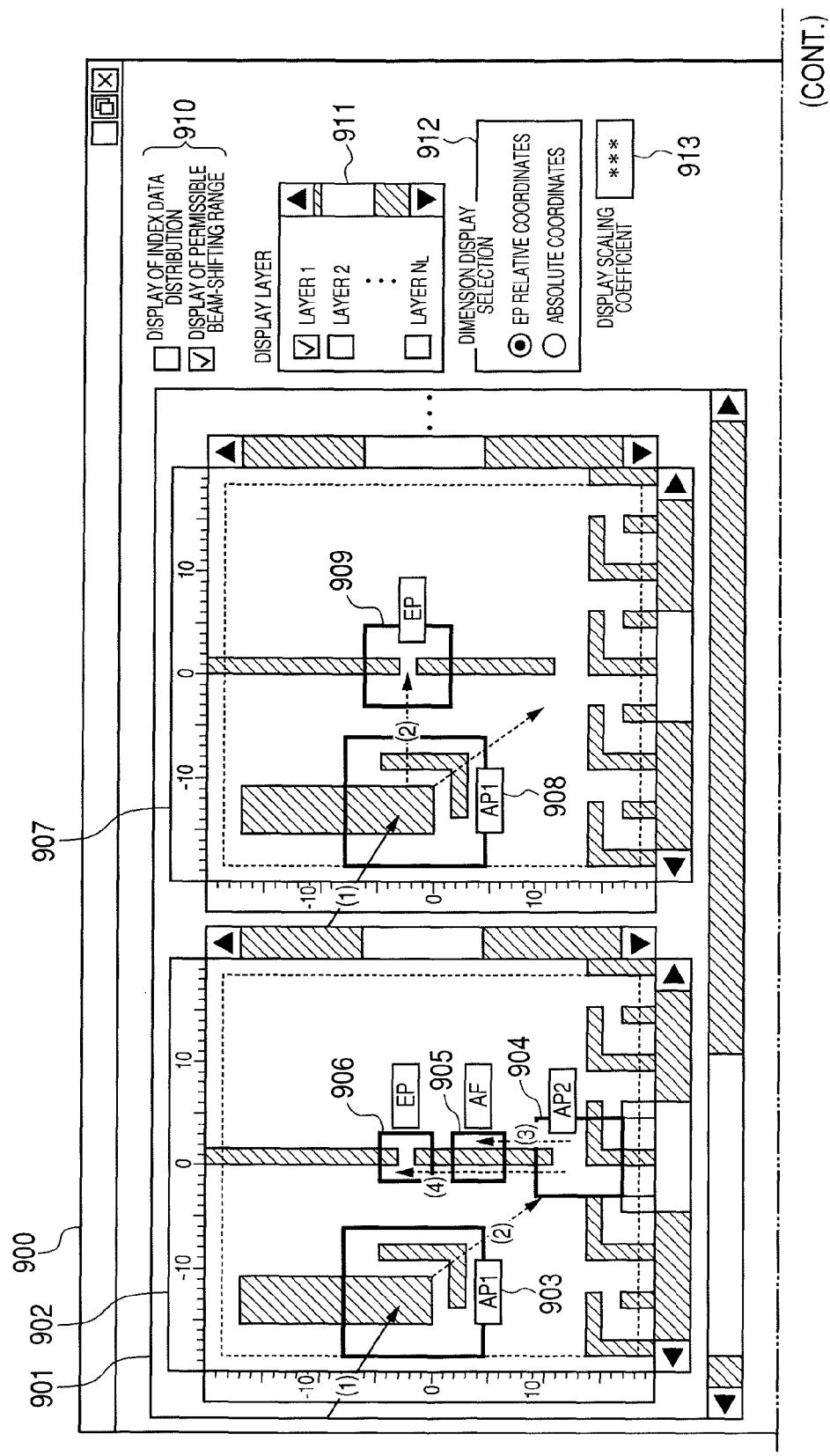

Although AP1, AP2, and AF are shown as adjusting points in FIGS. 9A and 9B, other kinds of adjusting points (AST, ABCC) and a plurality of adjusting points of the same kind (e.g., AF1, AF2) can be registered and displayed. In addition, although adjusting points are set for each EP in the GUI screen, one adjusting point is sharable between EPs (optimization of an EP-to-EP imaging sequence), as in an example of imaging any two EPs in sequence after addressing at a specific AP.

In the information display items of windows 914, 915, 919, and 935, the user can input necessary data, assign the system-provided data as defaults, or estimate/output data using an imaging/measuring recipe creating engine, if necessary. Estimation results by the imaging/measuring recipe creating engine can be displayed in visualized form in a window 901. In addition, these estimation results can have only several necessary kinds thereof arranged on the display (as in the form of 902 or 907), not all in one.

Reference number 902 denotes an example of estimation results display. In the present example, AP1 (903), AP2 (904), AF (905), and EP (906) are imaged and processed in that order. The arrow shown in solid-line form indicates moving the field by stage shifting, the arrow shown in dotted-line form indicates moving the field by beam shifting, and the parenthesized number (1), (2), (3) . . . on the arrow indicates an order of movement. In the present example, two-level addressing at the AP1 (903), AP2 (904) is executed to enhance the EP (906) in image-positioning accuracy. Estimation results 907 indicate that EP (909) is imaged after one addressing operation at AP1 (908). In addition, AF and other image-quality adjustments are omitted. Estimation results 907 imply inferiority in measuring accuracy, image quality, and positioning accuracy as compared to the estimation results 902, while at the same time implying superiority in imaging throughput. Evaluation items to be considered for each user are likely to change. In the present invention, however, specifying these standards in windows 914, 915 makes it possible to change one set of internal imaging/measuring recipe creating rules to another set in order to implement rapid response, as in estimation results 902, 907. The user can also display plural sets of other estimation results at the same time, such as estimation results 902 and 907, and adopt desired estimation results from the displayed sets. In addition, the imaging/measuring recipe creating rules from which the desired estimation results have been calculated can be uniformly to other EPs. Reference number 916 denotes a button for creating usable imaging/measuring recipes, and 917 a button for determining created imaging/measuring recipes.

Several options are available to display estimation results represented by the above estimation results 902, 907, for example. The available options include: an option (checkbox 910) for selecting whether to show or hide an index data display region for the adequacy level that was calculated in the system during the selection of each adjusting point, or for selecting whether to show or hide a display region for the beam-shifting-based permissible field-moving zone, for example, with the EP as its center; an option (checkbox 911) for selecting whether to display layers (interlayer pattern information) for the design data displayed in the window 902, 907; an option for displaying an acquired SEM image, instead of the design data; an option (checkbox 912) for selecting whether to display dimensional gauges around the window 902, 907, or for selecting whether to display dimensional gauge data in the form of relative coordinates from the EP, or in the form of absolute coordinates from a reference point; an option (checkbox 913) for designating a display magnification; and more.

In this GUI screen mode, imaging/measuring recipe information that has been calculated for a plurality of EPs can be displayed in list form (in FIGS. 9A and 9B, information for a plurality of EPs is sequentially displayed in a vertical direction in window 915, 935). Information for the plurality of EPs, however, can be selectively displayed on the GUI screen by classifying the information from any perspective such as: (a-3) whether the specifications requirements or the estimated specifications requirements or the user-required specifications are satisfied; (b-3) if the specifications are not satisfied, classifying the items according to contents; or (c-3) whether the EP-imaging parameters have been modified.

Additionally, the adequacy levels of each imaging/measuring recipe can be evaluated and then displayed in order of the adequacy level. Four examples of display, namely, (1) "Display of all items", (2) "Display only of items not satisfying the measuring accuracy tolerance", (3) "Display only of items not satisfying the position error tolerance", and (4) "Display only of the items changed in EP size or in shape", are listed on a pull-down menu 918. The GUI screen further has a function that classifies created imaging/measuring recipes from the above standpoints and displays the thus-classified recipes in arranged form on the GUI screen. This function also makes a cause-classified GUI display of the imaging/measuring recipes causing or likely to cause any problems, and thus allows efficient analysis and correction of the problems.

The description of the above examples has related primarily to the creation of an imaging/measuring recipe for one EP, but for example, one AP is also sharable between multiple EPs (after addressing at the AP, the beam is shifted to the two EPs in order), which includes expansion to the creation of an imaging/measuring recipe that includes the optimization of an EP-to-EP imaging sequence. Additionally, the present invention can be applied to not only SEM systems, but also optical microscopes or scanning probe microscopes (SPMs) or the like. That is to say, even for these optical microscopes or SPMs, an AP and/or the like may need to be set for viewing a desired EP, and the imaging/measuring recipe auto-creating method, data management method, system configuration, GUI, and more described in the present invention can be utilized in such cases. In SPMs, the SEM images described in the above examples will be converted into depth information acquired in the SPM, or the depth information will be converted into image form (depth data will be converted into the brightness level of the image).

As set forth above, according to the embodiments of the present invention, four effects can be obtained:

(1) Use of design data makes automatic creation of SEM imaging and measuring recipes under a waterless offline environment (without using a SEM apparatus), thus leading to reduced operator loads and to improved SEM system operation ratios. In addition, automation allows the creation of imaging/measuring recipes that does not depend upon any differences in skill between operators.

(2) During the sequence of creating imaging/measuring recipes according to the present invention, since each imaging/measuring recipe is created not only from the perspective of imaging an EP merely, but also from the perspective of realizing user-intended EP measurement, the necessity for correction or modification of the created imaging/measuring recipe by the operator is reduced and a successful imaging ratio or an accurate data measurements ratio is expected to improve over conventional ones.

(3) Even if any problems occur, or are likely to occur, in the imaging/measuring recipe created according to the present invention, efficient analysis and correction of the problems are possible by cause-classified GUI display.

(4) If the imaging/measuring recipe creating system according to the present invention, and the information that has been created or acquired by the system are shared among a plurality of SEM systems, no need arises to create independent imaging/measuring recipes for each system. In addition, since the successful and unsuccessful imaging/measurement results and other associated data that have been acquired from the multiple systems are shared, it is possible to early collect large volumes of result data and hence to early update any problematic imaging/measuring recipe creating rules on the basis of the result data.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

The invention claimed is:

1. A method for creating an imaging recipe to image a specimen by using a scanning electron microscope, the method comprising:
an input step for entering a position of an evaluation point on the specimen having a circuit pattern formed on the surface thereof, and design data of the circuit pattern around the evaluation point;
an evaluation point imaging position error evaluation step for evaluating, on the basis of the entered position of the evaluation point and the entered design data of the circuit pattern around the evaluation point, a tolerance for an imaging position error at the evaluation point;
an addressing evaluation step for evaluating, on the basis of the entered position of the evaluation point and the entered design data of the circuit pattern around the evaluation point, a value predicted of the imaging position error at the evaluation point when any region on the design data of the circuit pattern is defined as an addressing point; and
a determination step for determining, as the imaging recipe, positions of adjusting points each including at least the addressing point, or an imaging sequence or imaging parameters or adjusting methods for each adjusting point, on the basis of a relationship between the tolerance for the imaging position error at the evaluation point, the tolerance having been evaluated in the step of evaluating the imaging position error at the evaluation point, and the predicted value of the imaging position error at the evaluation point, the predicted value having been evaluated in the addressing evaluation step.

2. The method for creating an imaging recipe according to claim 1,
wherein in the addressing evaluation step, independent addressing accuracy in x- and y-directions each at the addressing point is evaluated and data predicted of independent imaging position errors in each of the x- and y-directions when a field of view is moved from the addressing point to the evaluation point is evaluated from the evaluated independent addressing accuracy in the x- and y-directions each at the addressing point.

3. The method for creating an imaging recipe according to claim 1,
wherein in the evaluation point imaging position error evaluation step, at least the kind of dimension to be measured is estimated from the entered position of the evaluation point and from the entered design data of the circuit pattern around the evaluation point in the input step, and tolerances for independent imaging position errors in each of the x- and y-directions at the evaluation point are estimated and evaluated on the basis of the estimated kind of dimension to be measured.

4. The method for creating an imaging recipe according to claim 1,
wherein in the determination step, determination rules on the addressing point are modified on the basis of the relationship between the tolerance for the imaging position error at the evaluation point, the tolerance having been evaluated in the step of evaluating the imaging position error at the evaluation point, and the predicted value of the imaging position error at the evaluation point, the predicted value having been evaluated in the addressing evaluation step.

5. The method for creating an imaging recipe according to claim 1, wherein:
the input step includes entering specifications requirements that include at least those relating to either measuring accuracy, imaging throughput, or image quality; and
the determination step includes determining, as the imaging recipe, positions of adjusting points each including at least the addressing point, or an imaging sequence or imaging parameters or adjusting methods for each adjusting point, in accordance with the entered specifications requirements.

6. The method for creating an imaging recipe according to claim 1,
wherein in the determination step, information about the imaging recipe which includes at least either the determined positions of the adjusting points or the determined imaging sequence or imaging parameters or adjusting methods therefor is classified according to presence/absence of problems or the kind of problem, and the imaging recipe information is displayed on a GUI screen, pursuant to the classification according to the presence/absence of problems or the kind of problem.

7. A method for creating an imaging recipe to image a specimen by using a scanning electron microscope, the method comprising:
an input step for entering a position of an evaluation point on the specimen having a circuit pattern formed on the surface thereof, and design data of the circuit pattern around the evaluation point;
an addressing evaluation step for evaluating, on the basis of the entered position of the evaluation point and the entered design data of the circuit pattern around the evaluation point, a value predicted of the imaging position error at the evaluation point when any region on the design data of the circuit pattern is defined as an addressing point;
an evaluation point imaging position error evaluation step for evaluating, on the basis of the entered position of the evaluation point and the entered design data of the circuit pattern around the evaluation point, a tolerance for an imaging position error at the evaluation point; and a determination step for determining, as a measuring recipe, positions or imaging parameters or measuring parameters for each evaluation point, on the basis of a relationship between the tolerance for the imaging position error at the evaluation point, the tolerance having been evaluated in the step of evaluating the imaging position error at the evaluation point, and the predicted value of the imaging position error at the evaluation point, the predicted value having been evaluated in the addressing evaluation step.

8. The method for creating an imaging recipe according to claim 7, wherein in the addressing evaluation step, independent addressing accuracy in x- and y-directions each at the addressing point is evaluated and data predicted of independent imaging position errors in each of the x- and y-directions when a field of view is moved from the addressing point to the evaluation point is evaluated from the evaluated independent addressing accuracy in the x- and y-directions each at the addressing point.

9. The method for creating an imaging recipe according to claim 7, wherein in the evaluation point imaging position error evaluation step, at least the kind of dimension to be measured is estimated from the entered position of the evaluation point and from the entered design data of the circuit pattern around the evaluation point in the input step, and tolerances for independent imaging position errors in the x- and y-directions each are estimated, and evaluated, from the estimated kind of dimension to be measured.

10. The method for creating an imaging recipe according to claim 7, wherein:

the input step includes entering specifications requirements that are a combination of specifications requirements relating to at least either measuring accuracy, imaging throughput, or image quality; and the determination step includes further determining, as the measuring recipe, positions or imaging parameters or measuring parameters for each evaluation point, in accordance with the entered specifications requirements.

11. The method for creating an imaging recipe according to claim 7, wherein in the determination step, information about the measuring recipe which includes at least either the positions or imaging parameters or measuring parameters that have been determined in the determination step is classified according to presence/absence of problems or the kind of problem, and the measuring recipe information is displayed on a GUI screen, pursuant to the classification according to the presence/absence of problems or the kind of problem.

12. A SEM system including a scanning electron microscope, the system comprising:

a database means which stores data including a position of an evaluation point on a specimen having a circuit pattern formed on the surface thereof, and design data of the circuit pattern around the evaluation point;

an input means which enters specifications requirements intended to image the specimen via the scanning electron microscope;

an evaluation point imaging position error evaluation means which enters the position of the evaluation point and the design data of the circuit pattern around the evaluation point, on the basis of the imaging specifications requirements selected from the data stored within the database means and entered from the input means, and evaluating a tolerance for the imaging position error at the evaluation point;

an addressing evaluation means which enters the position of the evaluation point and the design data of the circuit pattern around the evaluation point, on the basis of the imaging specifications requirements selected from the data stored within the database means and entered from the input means, and evaluates a value predicted of the imaging position error at the evaluation point when any region on the design data of the circuit pattern is defined as an addressing point; and an imaging recipe determination means which determines, as the imaging recipe, positions of adjusting points each including at least the addressing point, or an imaging sequence or imaging parameters or adjusting methods for each adjusting point, on the basis of a relationship between the tolerance for the imaging position error at the evaluation point, the tolerance having been evaluated by the evaluation point imaging position evaluation means, and the predicted value of the imaging position error at the evaluation point, the predicted value having been evaluated by the addressing evaluation means.

13. The SEM system according to claim 12, wherein the addressing evaluation means evaluates independent addressing accuracy obtained in x- and y-directions each at the addressing point, and evaluates, from the evaluated independent addressing accuracy in the x- and y-directions each at the addressing point, data predicted of independent imaging position errors in each of the x- and y-directions when a field of view is moved from the addressing point to the evaluation point.

14. The SEM system according to claim 12, wherein the evaluation point imaging position error evaluation means estimates at least the kind of dimension to be measured at the evaluation point, on the basis of the evaluation point position and evaluation point peripheral circuit pattern design data entered from the database means, and estimates and evaluates tolerances for independent imaging position errors in the x- and y-directions each at the evaluation point, on the basis of the estimated kind of dimension to be measured.

15. The SEM system according to claim 12, wherein the imaging recipe determination means modifies determination rules relating to the addressing point, on the basis of a relationship between the tolerance for the imaging position error at the evaluation point, the tolerance having been evaluated by the evaluation point imaging position error evaluation means, and the predicted value of the imaging position error at the evaluation point, the predicted value having been evaluated by the addressing evaluation means.

16. The SEM system according to claim 12, wherein:

the input means includes entering specifications requirements that include at least those relating to either measuring accuracy, imaging throughput, or image quality; and the imaging recipe determination means further includes determining, as the imaging recipe, positions of adjusting points each including at least the addressing point, or an imaging sequence or imaging parameters or adjusting methods for each adjusting point, in accordance with the specifications requirements entered from the input means.

17. The SEM system according to claim 12,
wherein the imaging recipe determination means classifies, according to presence/absence of problems or the kind of problem, information about the imaging recipe which includes at least either the determined positions of the adjusting points or the determined imaging sequence or imaging parameters or adjusting methods therefor, and displays the classified imaging recipe information on a GUI screen, pursuant to the classification according to the presence/absence of problems or the kind of problem.

18. A SEM system including a scanning electron microscope, the system comprising:
a database means which stores data including a position of an evaluation point on a specimen having a circuit pattern formed on the surface thereof, and design data of the circuit pattern around the evaluation point;
an input means which enters specifications requirements intended to image the specimen via the scanning electron microscope;
an evaluation point imaging position error evaluation means which enters the position of the evaluation point and the design data of the circuit pattern around the evaluation point, on the basis of the imaging specifications requirements selected from the data stored within the database means and entered from the input means, and evaluates a tolerance for the imaging position error at the evaluation point;
an addressing evaluation means which enters the position of the evaluation point and the design data of the circuit pattern around the evaluation point, on the basis of the imaging specifications requirements selected from the data stored within the database means and entered from the input means, and evaluates a value predicted of the imaging position error at the evaluation point when any region on the design data of the circuit pattern is defined as an addressing point; and
a measuring recipe determination means which determines, as a measuring recipe, positions or imaging parameters or measuring parameters for each evaluation point, on the basis of a relationship between the tolerance for the imaging position error at the evaluation point, the tolerance having been evaluated by the evaluation point imaging position evaluation means, and the predicted value of the imaging position error at the evaluation point, the predicted value having been evaluated by the addressing evaluation means.

19. The SEM system according to claim 18,
wherein the addressing evaluation means evaluates independent addressing accuracy obtained in x- and y-directions each at the addressing point, and evaluates, from the evaluated independent addressing accuracy in the x- and y-directions each at the addressing point, data predicted of independent imaging position errors in each of the x- and y-directions when a field of view is moved from the addressing point to the evaluation point.

20. The SEM system according to claim 18,
wherein the evaluation point imaging position error evaluation means estimates at least the kind of dimension to be measured at the evaluation point, on the basis of the evaluation point position and evaluation point peripheral circuit pattern design data stored in the database means, and estimates and evaluates tolerances for independent imaging position errors in the x- and y-directions each at the evaluation point, on the basis of the estimated kind of dimension to be measured.

21. The SEM system according to claim 18,
wherein the input means enters, as the specifications requirements, specifications relating to at least either measuring accuracy, imaging throughput, or image quality, or more than one thereof, and in the determination step, further determines, as the measuring recipe, positions of adjusting points, or an imaging sequence or imaging parameters or adjusting methods for each adjusting point, in accordance with the entered specifications requirements.

22. The SEM system according to claim 18, further comprising:
an output means with a display screen, adapted to classify, according to the presence/absence of problems or the kind of problem, information about the measuring recipe which includes at least either the position, imaging parameters, and measuring parameters of the evaluation point that have been determined by the measuring recipe determination means, and display the classified measuring recipe information on a display screen of the output means, pursuant to the classification according to the presence/absence of problems or the kind of problem.

* * * * *